United States Patent
Penugonda et al.

(10) Patent No.: US 9,473,463 B2
(45) Date of Patent: Oct. 18, 2016

(54) CONTROL WORD AND ASSOCIATED ENTITLEMENT CONTROL MESSAGE CACHING AND REUSE

(71) Applicant: COMBINED CONDITIONAL ACCESS DEVELOPMENT AND SUPPORT, LLC, San Diego, CA (US)

(72) Inventors: Madhu Penugonda, San Diego, CA (US); Lawrence Tang, San Diego, CA (US); Kenneth Miller, Poway, CA (US); Douglas Petty, San Diego, CA (US)

(73) Assignee: Combined Conditional Access Development & Support, LLC, San Diego, CA (US)

( * ) Notice: Subject to any disclaimer, the term of this patent is extended or adjusted under 35 U.S.C. 154(b) by 0 days.

(21) Appl. No.: 14/445,799

(22) Filed: Jul. 29, 2014

(65) Prior Publication Data
US 2016/0036783 A1 Feb. 4, 2016

(51) Int. Cl.
*H04L 29/06* (2006.01)
*H04L 29/08* (2006.01)

(52) U.S. Cl.
CPC ........... *H04L 63/0428* (2013.01); *H04L 67/02* (2013.01)

(58) Field of Classification Search
CPC ............ H04N 21/2662; H04N 21/4384; H04N 7/1675; H04N 21/4623; H04N 21/6125; H04N 21/64322; H04N 21/4405; H04L 63/0428; H04L 67/02
See application file for complete search history.

(56) References Cited

U.S. PATENT DOCUMENTS

| | | | |
|---|---|---|---|
| 8,687,806 B2 * | 4/2014 | Vince et al. | 380/44 |
| 2007/0033282 A1 * | 2/2007 | Mao et al. | 709/226 |
| 2008/0209232 A1 * | 8/2008 | Kudelski et al. | 713/193 |
| 2008/0294786 A1 * | 11/2008 | Tinker et al. | 709/229 |
| 2009/0028331 A1 * | 1/2009 | Millar et al. | 380/255 |
| 2011/0317833 A1 * | 12/2011 | Westerveld et al. | 380/210 |
| 2013/0251146 A1 * | 9/2013 | Roelse | 380/210 |
| 2014/0086407 A1 * | 3/2014 | Gustafsson et al. | 380/210 |

OTHER PUBLICATIONS

Steven Morris "The Conditional Access API." Internet non-patent literature from www.tvwithoutborders.com. Publication date: 2011. 8 pages.*

* cited by examiner

*Primary Examiner* — Don Zhao
(74) *Attorney, Agent, or Firm* — Banner & Witcoff, Ltd.

(57) ABSTRACT

Methods, systems, computer-readable media, and apparatuses for providing control word and associated entitlement control message (ECM) functionalities are presented. In some embodiments, a computing device may cache concurrently a first set of control words and a first set of entitlement control messages (ECMs) associated with the first set of control words. The computing device may encrypt a transport stream with a particular control word of the first set of control words. The computing device may insert a particular ECM, of the first set of ECMs, corresponding to the particular control word into the transport stream sent to a device downstream from the computing device. In some embodiments, a computing device may reuse control words and associated ECMs.

20 Claims, 8 Drawing Sheets

CONTROL WORD AND ASSOCIATED ENTITLEMENT CONTROL MESSAGE CACHING AND REUSE

BACKGROUND

The number of channels and/or services offered or available is increasing from hundreds to tens of thousands. Providers are increasingly attempting to consolidate the number of network elements needed to provide services. As a result, fewer devices may support a far greater number of services. In providing such services, encryption and decryption techniques may be implemented to prevent unauthorized access to the services.

The Digital Video Broadcasting (DVB) standard, ETSI TS 103 197 v1.5.1 (2008-10) offers a technique for producing and consuming a control word and associated entitlement control message (ECM) for one cryptographic period (also referred to herein as a crypto period) at a time. A control word may be a secret key that may be used to scramble a clear media stream at an encryption device such as, for example, an Encryptor, an Edge Quadrature Amplitude Modulation modulator (EQAM) with an embedded encryptor, a Converged Cable Access Platform (CCAP) device with an embedded encryptor, computer, and/or other computing device, and to descramble a scrambled media stream (e.g., a channel) at a receiver device such as, for example, a set-top box, computer, tablet, and/or other computing device.

As a result, once a network element (e.g., a scrambler) inserts an ECM for one cryptographic period into a media stream, the network element may communicate with generator of the control words and the generator of the ECMs to obtain the next control word and ECM for the next cryptographic period. As a result of retrieving control words and associated ECMs on a per cryptographic period basis and because a cryptographic period typically may be a few seconds in length, the network elements may frequently communicate with the generators resulting in inefficient bandwidth usage across the network. Additionally, the cryptographic period may be set to a longer timeframe than is desired to account for latency in retrieval of the next control word and associated ECM from the generators. For example, the latency time may include the time taken to send a request for the next control word and associated ECM from the scrambler to the generators, the time the generators take to create the next control word and associated ECM, and the time taken for the scrambler to receive the next control word and associated ECM. Furthermore, the frequent retrieval of the control words and associated ECMs impedes scaling consolidated systems to support thousands of services. These and other shortcomings are addressed by the disclosure.

SUMMARY

Some aspects of the disclosure relate to computer hardware and software. In particular, one or more aspects of the disclosure generally relate to computer hardware and software for providing control word and associated entitlement control message (ECM) management functionalities.

Various aspects of the disclosure provide more efficient, effective, functional, and convenient ways of controlling creation, retrieval and distribution of control words and associated ECMs in an increasingly consolidated cable and internet service architecture. In one or more embodiments discussed in greater detail below, control word and associated ECM management functionalities are deployed, implemented, and/or used in a number of different ways to provide one or more of these and/or other advantages.

In some embodiments, a computing device may cache concurrently a first set of control words and a first set of entitlement control messages (ECMs) associated with the first set of control words. The computing device may encrypt a transport stream with a particular control word of the first set of control words. The computing device may insert into the transport stream a particular ECM, of the first set of ECMs, corresponding to the particular control word sent to a device downstream from the computing device.

In some embodiments, a computing device may encrypt a transport stream using a first control word during a first cryptographic period and may encrypt the transport stream using a second control word during a second cryptographic period after the first cryptographic period. The computing device may encrypt the transport stream using a first copy of the first control word during a particular cryptographic period after the second cryptographic period.

In some embodiments, a computing device may schedule a first control word and an associated first ECM for use during a first cryptographic period and a second control word and an associated second ECM for use during a second cryptographic period. The first cryptographic period may be different from the second cryptographic period. The computing device may schedule based on information received from an entitlement control data device and indicates a use order associated with the first control word and the second control word.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing control word and associated ECM management functionalities. Before discussing these concepts in greater detail, however, several examples of computing architecture that may be used in implementing and/or otherwise providing various aspects of the disclosure will first be discussed with respect to FIGS. 1 and 2.

Computing Architecture

Figure 1:
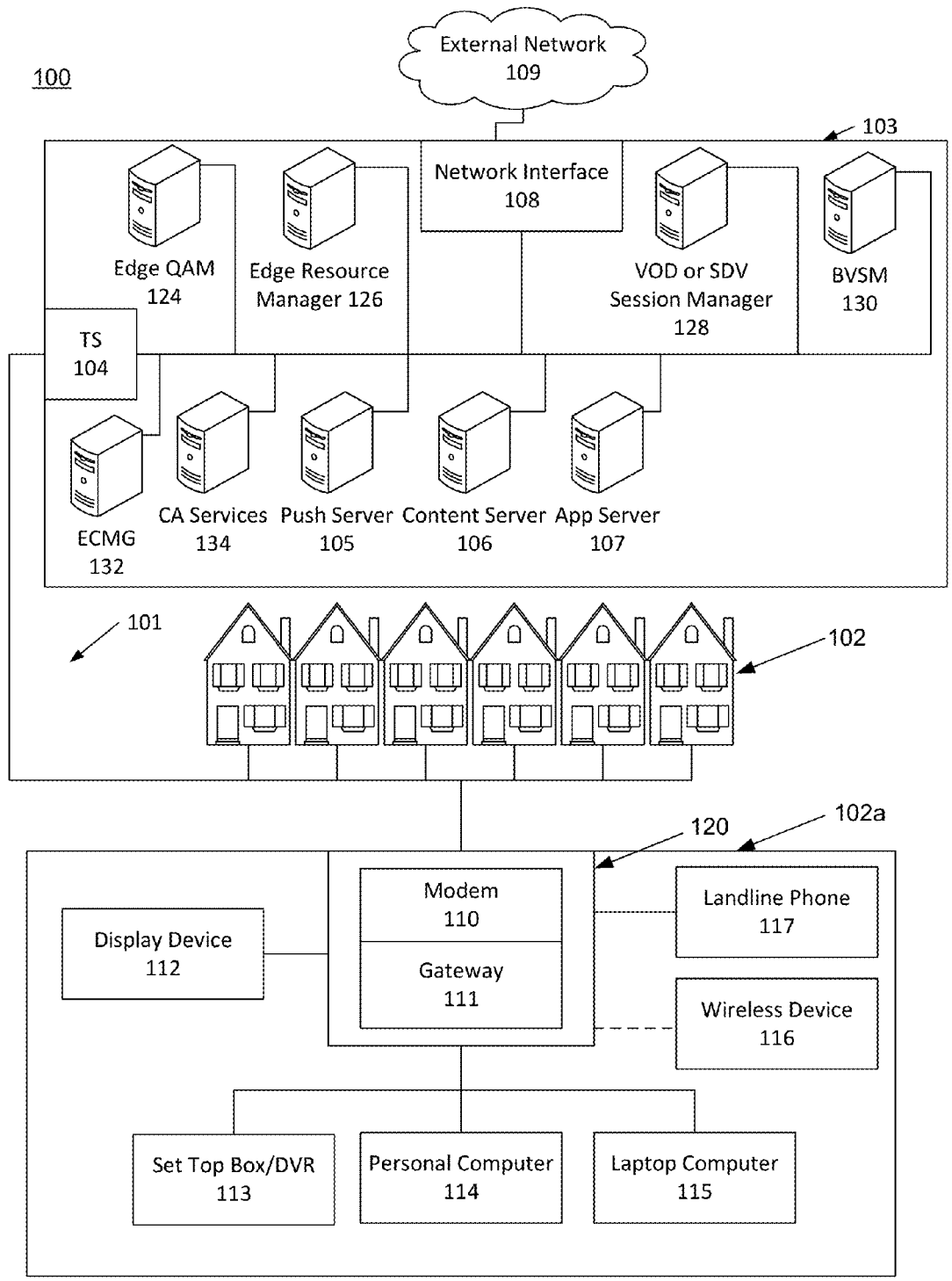
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies. The local office 103 may also include an edge quadrature amplitude modulation modulator (EQAM) 124 that outputs video on its multitude of radio frequency (RF) ports.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), a digital transport adapter (DTA), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The local office 103 may include a variety of servers 124-134 to manage control words and associated ECMs. For example, the local office 103 may include an EQAM 124 and an entitlement control message generator (ECMG) 132. The EQAM 124 may be one or more computing devices that are configured for use with a converged cable access platform (CCAP). The EQAM 124 may include an embedded encryptor (e.g., a scrambler) to encrypt or scramble clear media streams (also called "transport" streams) using controls words. The ECMG 132 may, in response to a request from e.g., the EQAM 124, generate the control words and associated ECMs used to calculate the control words for use with a service. The ECMG 132 may send the ECMs to the EQAM 124. The ECMG 132 may encrypt the control words before transmitting them to the EQAM 124 and the EQAM 124 may, upon receiving the encrypted control words from the ECMG 132, decrypt the encrypted control words. Additionally or alternatively, in some embodiments, a control word generator (CWG), not shown, different from the ECMG 132 may generate the control words. In such embodiments, the CWG may interact and/or may otherwise communicate with the ECMG 132 so that the ECMG 132 may retrieve control words from the CWG and generate ECMs based on those control words. For example, the ECMG 132 may send a request for control words to the CWG and, in response, may receive control words generated by the CWG.

The local office 103 may include an edge resource manager 126 and a video on demand (VOD) and/or switched digital video (SDV) Manager 128. The term video on demand is used generically to also include, for example, a cloud digital video recorder (cDVR) or cloud streaming services. The VOD and/or SDV manager server 128 may interact with client devices at premises 102 to start a program, purchase a program, and/or manipulate a program (e.g., pause, fast-forward, and/or rewind a program). For example, the VOD and/or SDV manager 128 may contact the appropriate VOD server (e.g., a content server 106) and one or more other components of the local office 103 so that the local office 103 may determine what content is being purchased and by who (e.g., which subscriber and/or client device). The VOD and/or SDV manager 128 may initiate a particular session. Particularly, the VOD and/or SDV manager 128 may send to the edge resource manager 126 a message including an identification of the client device and/or subscriber requesting a specific asset (e.g., the content). The edge resource manager 126 may determine information about the plan of the client device and/or subscriber including, for example, which city and/or house the client device and/or subscriber is located. From such information, the edge resource manager 126 may determine (e.g., pinpoint) which channel the EQAM 124 should transmit to the client device of the subscriber. As used herein, the term EQAM refers to an EQAM that includes an embedded encryptor.

The edge resource manager 126 may send to the EQAM 124 (and/or other C-CAP devices) messages including an indication of which channels are being transmitted to these specific downstream premises. For example, the message may indicate that these QAM channels and/or these high-speed IP channels are going to these 100 houses including these client devices of the subscriber. The edge resource manager 126 may also send to the EQAM 124 copy control information about the requesting client devices of the subscriber. The copy control information may include the copying capabilities of the requesting client devices of the subscriber to e.g., an external drive. In some embodiments, the copy control information may include copy protection information such as digital rights management information. The EQAM 124 may send the copy control information to the ECMG 132.

The local office 103 may include a broadcast video services manager server (BVSM) 130 and/or a conditional access services server (CA) 134. The BVSM 130 may determine access criteria needed for each broadcast service and session. Each content provider may have their own specific access criteria. The BVSM 130 may tag via a universal unique identifier (UUID) each particular access criteria. The BVSM 130 may send the UUID to the CA 134.

The CA 134 may be a controller such as, for example, a digital addressable controller (DAC), and/or any other integrated device to manage various conditional access services. The CA 134 may provide hierarchical key information to the ECMG 132. In the case of broadcast services, the services are well-defined continuously running sessions. The CA 134 may provide information about those broadcast sessions (also referred to herein as access criteria) to the ECMG along with the UUID. The CA 134 may send to the ECMG 132 copy control information for the broadcast services.

Upon request from the EQAM 124, the EQAM 124 receives from the ECMG 132 encryption session information, the control words and the associated ECMs for the requested content. The EQAM 124 may encrypt a transport stream using the control words and insert the associated ECMs into the transport stream traversing a specified QAM channel to be received by the specified client devices. Once the EQAM 124 uses a control word to encrypt the transport stream, the EQAM 124 may then discard the control word. In other words, the EQAM 124 may consume the control words as they are used to encrypt the transport stream. In some embodiments, the EQAM may retain a copy of the control word. The client devices may receive the scrambled content including the ECMs by tuning to and/or otherwise accessing the channel (e.g., the specified QAM channel). The client devices at the premises 102 may also use session key information to properly derive the control words from the ECMs (e.g., to calculate the control words using information contained in the ECMs or to decrypt the encrypted control words found in the ECMs). The client devices may receive the session key in entitlement management messages (EMMs). Once the client devices calculate the control word from the ECM, the client device may descramble the content on the channel based on the control word during an appropriate crypto period.

The term "crypto period" is used both in reference to the EQAM 124 as well as in reference to the client devices. The sequence of crypto periods at the EQAM 124 are independent of and/or detached from the sequence of crypto periods at the client devices. For example, the EQAM 124 may encrypt a transport stream using a first control word during a first crypto period of the EQAM 124. The EQAM 124 may encrypt the transport stream using a second control word during a second crypto period of the EQAM 124. Once a client device receives the transport stream, the client device may then derive the first control word from the first ECM included in the transport stream and decrypt the transport stream during a first crypto period of the client device. Similarly, the client may derive the second control word from the second ECM included in the transport stream and decrypt the transport stream during a second crypto period of the client device.

While the servers 124-134 are shown as part of the local office 103, in some embodiments, one or more of the servers 124-134 may be part of a third party independent of the local office 103. In such embodiments, the servers 124-134 may communicate with one another and/or the local office 103 via the external network 109.

While the servers 124-134 are shown as separate components, in some embodiments, the servers 124-134 may be combined and/or otherwise included within one or more other components of the local office 103.

Figure 2:
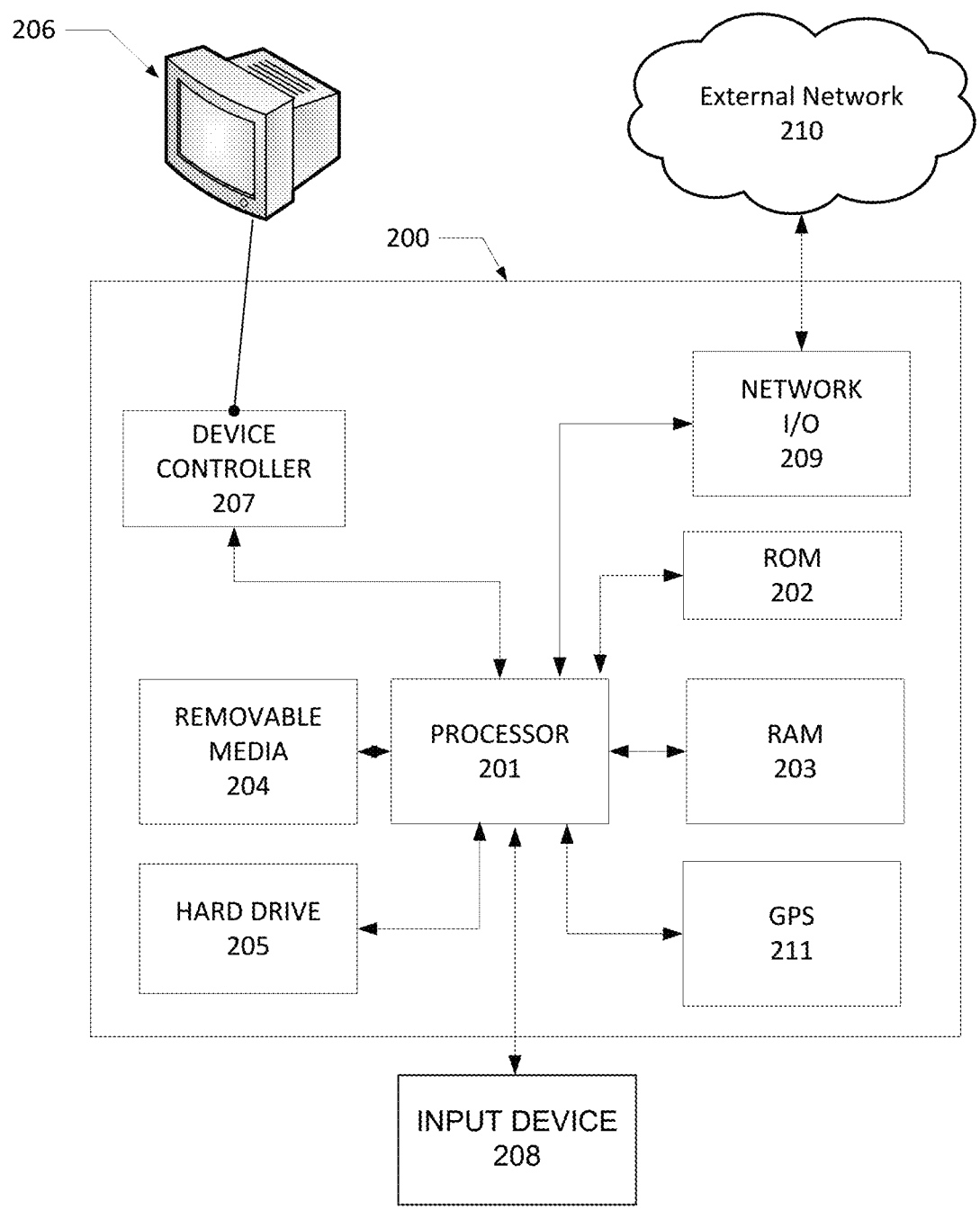
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Control Word and ECM Architecture and Message Flow

Figure 3:
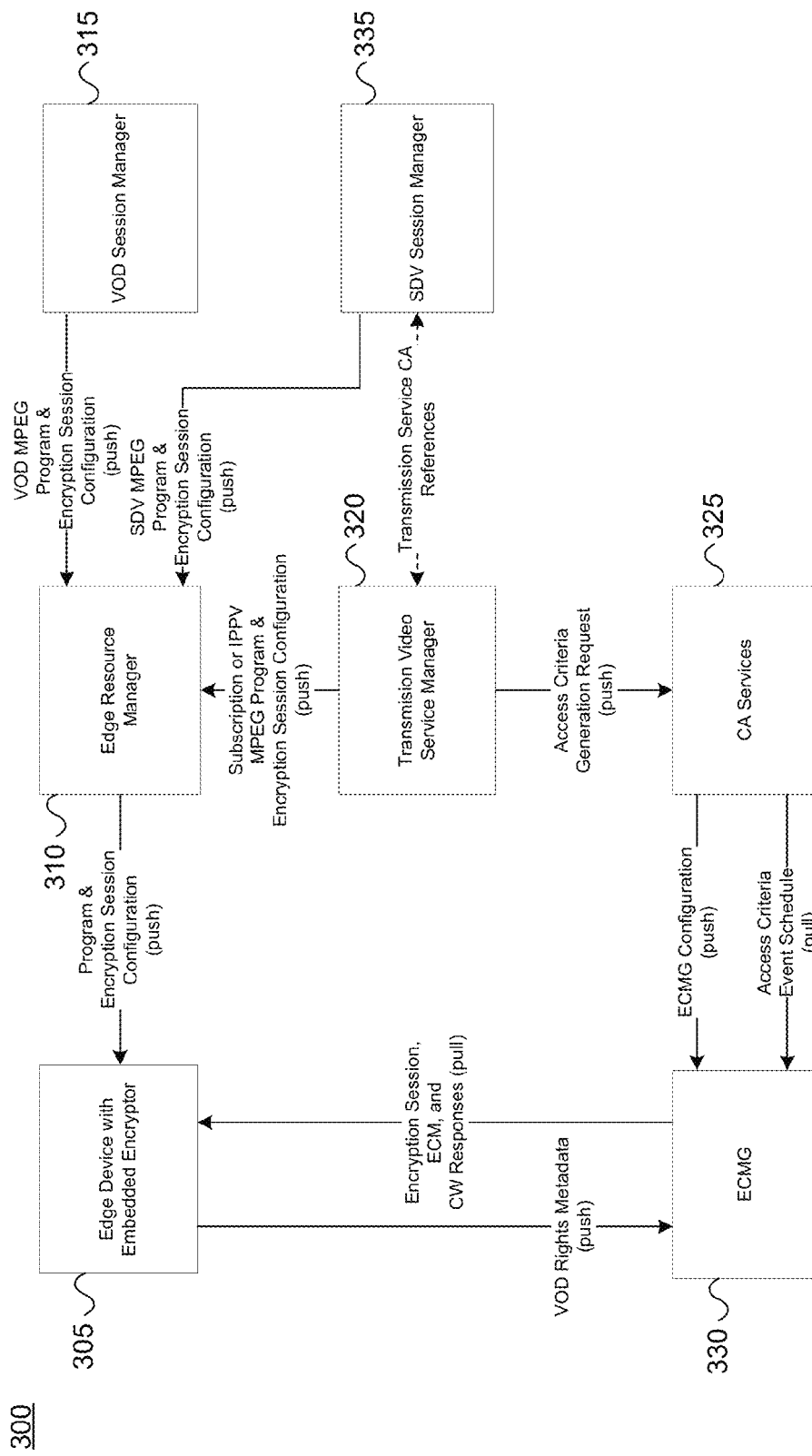
FIG. 3 illustrates an example of another system block diagram that can be used to implement any of the various features described herein.

FIG. 3 illustrates an example of another system block diagram that can be used to implement any of the various features described herein. Some of the components of the local office and/or headend 103 described above with reference of FIG. 1 have been omitted for the sake of simplicity. The architecture of system 300 depicted in FIG. 3 is similar in many respects to the architecture of network 100 described above with reference to FIG. 1 and may include additional features not mentioned above.

In this case, FIG. 3 shows part of a converged cable access platform (CCAP) encryption infrastructure and associated data flows therein. The system 300 may be a local office and/or headend including one more servers 305-330. For example, the system 300 may include an edge device (also referred to herein as an edge quadrature amplitude modulation modulator or EQAM) 305 with embedded encryptor for use with a converged cable access platform (CCAP), an edge resource manager (ERM) 310, a video-on-demand (VOD) session manager 315, a transmission video service manager (also referred to herein as a broadcast video service manager or BVSM) 320, conditional access (CA) services 325, an entitlement control message generator (ECMG) 330, and a switched digital video (SDV) session manager.

The arrows indicate the direction of the data flow. A push model indicates that the producer of the data connects to the consumer to push the data over (i.e., automatically send to the receiving device the data without being prompted and/or requested by the device receiving the data). A pull model indicates that the consumer of the data connects to the producer to pull the data over (i.e., the sending device sends the data to the receiving device in response to a request for such data received from the receiving device). In other embodiments, a different set of interface protocols may be used. For example, one or more items indicated as being a push model may be a pull model. Similarly, in such embodiments, one or more items indicated as being a pull model may be a push model.

The CA services 325 may push an ECMG configuration to the ECMG 330. The CA services 325 may assign the ECMG 330 to security domains and may send security domain information to the ECMG 330. The client device of the subscriber (not shown) may request a service (e.g., a video service) on a channel (e.g., a QAM channel). Each QAM channel may be dedicated to a specific service. Additionally or alternatively, one or more QAM channels may be dedicated to multiple services. An operator's operations support system (not shown) may send the session request for a broadcast service to the BVSM 320. The client device may send the session request for a VOD service to the VOD session manager 315. The request for service may indicate the particular program requested and subscription information of the client device and/or the subscriber. In some embodiments, the request for service may be sent in response to a channel change at a set-top box, a DTA, and/or another computing device.

The BVSM 320 manages subscription and interactive pay-per-view (IPPV) mpeg programs and encryption sessions. The BVSM 320 may determine access criteria needed for each service and session since each conditional access provider may have their own specific access criteria. The BVSM 320 may push an access criteria generation request to the CA services 325. The access criteria generation request may direct the CA services 325 to generate access criteria for a video service. The access criteria generation request may also instruct the CA services 325 to make the access criteria available to the ECMG 330. The BVSM 320 may tag access criteria for each video service with a universal unique identifier (UUID), which may also be referred to herein as video services access criteria UUID or simply UUID.

In response to receiving the access criteria generation request from the BVSM 320, the CA services 325 may generate the access criteria for a video service and any associated event schedule such as, for example, any associated event schedule in the case of a pay-per-view program. The CA services 325 may make the access criteria available for retrieval by the ECMG 330. For example, the access criteria and any associated event schedule may be pulled by the ECMG 330 from the CA services 325. In other words, upon request for the access criteria and/or the access criteria event schedule, the ECMG 330 may receive such access criteria and/or event schedule from the CA services 325.

The CA services 325 may be implemented by a controller such as, for example, a digital addressable controller (DAC) and/or any other integrated device to manage various conditional access services. The CA services 325 may provide hierarchical key information to the ECMG 330. For example, the CA services 325 may send to the ECMG 330 multiple layers of session keys needed to properly create control words. These session keys are also needed by the client devices of the subscriber so that the client devices may properly derive control words received in ECMs.

In the case of broadcast services, the services are well-defined continuously running sessions and services may be assigned to predefined channel maps that are only occasionally changed (e.g., when a new channel is introduced or when an existing channel is dropped). The CA services 325 may provide information (e.g., access criteria) about those broadcast sessions to the ECMG 330. For example, the CA services 325 may send the UUIDs assigned by the BVSM 320 to the ECMG 330 so that the ECMG 330 may uniquely identify the access criteria associated with a service for which a request is received from the EQAM 305.

The CA services 325 may send to the ECMG 330 copy control information for the broadcast services. Copy control information may include the content copying capabilities of the requesting client devices. The copy control information may also include digital rights management information to prevent copying of content sent to the requesting client devices. The digital right management information may be based on the content copying capabilities of the requesting content devices.

The ECMG 330 may, based in part on one or more of the ECMG configuration, access criteria, program event schedule, and/or security domain information received from the CA services 325, produce appropriate messages for the EQAM 305 encryptor. Additionally, the ECMG may also receive UUID from the EQAM 305 for the specific service and may generate appropriate messages based thereon.

Returning to the BVSM 320, the BVSM 320 may send to the SDV session manager 335 access criteria UUIDs assigned by the BVSM 320 for those services identified as SDV programs.

The session manager 315 may set up a link between a VOD server (at which the requested content is stored) and the EQAM 305. The VOD manager 315 may interact with the client devices to start a program, purchase a program, and/or manipulate a program (e.g., pause, fast-forward, and/or rewind a program). For example, the VOD session manager 315 may contact the appropriate VOD server (e.g., a content server) and one or more other components of the local office so that the local office may determine what content is being purchased and by who (e.g., which subscriber and/or client device).

Once the content being purchased and the requesting subscriber are determined, the VOD session manager 315 may initiate a particular session. Particularly, the session manager 315 may send to the ERM 310 a message indicating that this particular client device is requesting this specific asset (e.g., the content associated with the video service). The ERM 310 may determine information about the plan of the client device and/or subscriber including, for example, which city and/or house the client device and/or subscriber is located. From such information, the ERM 310 may determine which QAM channels are to be used to transmit what video content and to which client devices. For example, the ERM 310 may determine (e.g., pinpoint) which QAM channel it needs to send and may send to the EQAM 305 a message identifying the QAM channels and the groups of subscribers (e.g., these 100 houses). The group of subscribers may include the subscriber associated with the requesting client device. In response, the EQAM 305 may allocate a QAM channel to the requested service.

The VOD session manager 315 may push to the ERM 310 a VOD MPEG program as well as an encryption session configuration. For example, the VOD MPEG program may be a movie ordered by the subscriber from the client device.

The SDV session manager 335 may be used to manage SDV functionality. SDV services are different from typical broadcast and VOD services. In an exemplary embodiment, if a particular channel lineup is associated with 100 houses, when a first person requests a channel, a transport stream for the channel is established. Subsequent persons who request the channel are joined to the existing transport stream for the channel. Additionally, the transport stream continues to be sent to the 100 houses even if a person closes the channel. However, the transport stream for the channel is torn down once a last person closes the channel.

The SDV session manager 335 may communicate with the BVSM 320 and the ERM 310. For example, the SDV session manager 335 may receive from the BVSM 320 transmission or broadcast service conditional access references. For example, the SDV session manager 335 may send to the ERM 310 a SDV MPEG program and an encryption session configuration.

In some embodiments, the BVSM 320 may push to the ERM 310 the subscription and/or IPPV MPEG Program. The BVSM 320 may also push to the ERM 310 an encryption session configuration for the program (e.g., the video service). For example, the BVSM 320 may push to the ERM 310 the video services access criteria UUID along with information about the video session. The ERM 310 may then allocate the video service to the EQAM 305.

The ERM 310 may send to the EQAM 305 (and/or other CCAP devices) messages including the program (e.g., the MPEG program) and the encryption session configuration. Further, the ERM 310 may send to the EQAM 305 messages including an indication of which QAM channels are going to which specific downstream premises (e.g., these QAM channel are going to these 100 houses including these client devices of the subscriber). The ERM 310 may also send to the EQAM 305 copy control information about the requesting client devices of the subscriber. The copy control information may include the copying capabilities of the requesting client devices of the subscriber and/or digital rights management information. In some embodiments, the system 300 might not include the ERM 310 (i.e., such a device may be absent from the system 300 or may be used if present within the system 300). In such embodiments, the configuration information is provided to the EQAM 305 in a computer-readable file over the network through various means by the operations support system. The configuration information is provided statically at startup of the EQAM 305 and may be subsequently updated.

In some embodiments, the EQAM 305 may push VOD rights metadata to the ECMG 330. For example, the EQAM 305 may send the copy control information to the ECMG 330 so that the ECMG 330 may produce appropriate messages (e.g., ECMs) for the EQAM 305 encryptor.

In some embodiments, the EQAM 305 may pull the encryption session, ECMs and control words (CWs) responses from the ECMG 330. For example, the EQAM 310 may include a synchronizer that may interact with the ECMG 330 to retrieve ECMs. The EQAM 310 may send a request for a particular number of control words sufficient to stream a video service for a predetermined period of time (e.g., six crypto periods). The ECMG 330 may, in response to receiving such a request, generate the control words and ECMs sufficient to stream the service for the predetermined period of time. The ECMG 330 may then transmit the ECMs including the control words to the EQAM 305. The EQAM 305 may include an embedded encryptor (e.g., a scrambler) to encrypt and/or scramble the transport stream associated with the video service using the controls words.

In some embodiments, there may be a one to one link between the EQAM 305 and the ECMG 330 because each service may be individually configured and controlled. The EQAM may request a specific service and request for CWs and ECMs for multiple crypto periods for use with that specific service. The ECMG may decide the optimum number of ECMs including respective control words on a per stream or service basis.

Batch Control Word and Associated ECM Features

Having discussed several examples of the control word architecture that may be used in providing and/or implementing various aspects of the disclosure, a number of embodiments will now be discussed in greater detail. In particular, and as introduced above, some aspects of the disclosure generally relate to providing batch control words and associated ECMs management functionalities. In the description below, various examples illustrating how such functionalities may be provided in accordance with one or more embodiments will be discussed.

Figure 4:
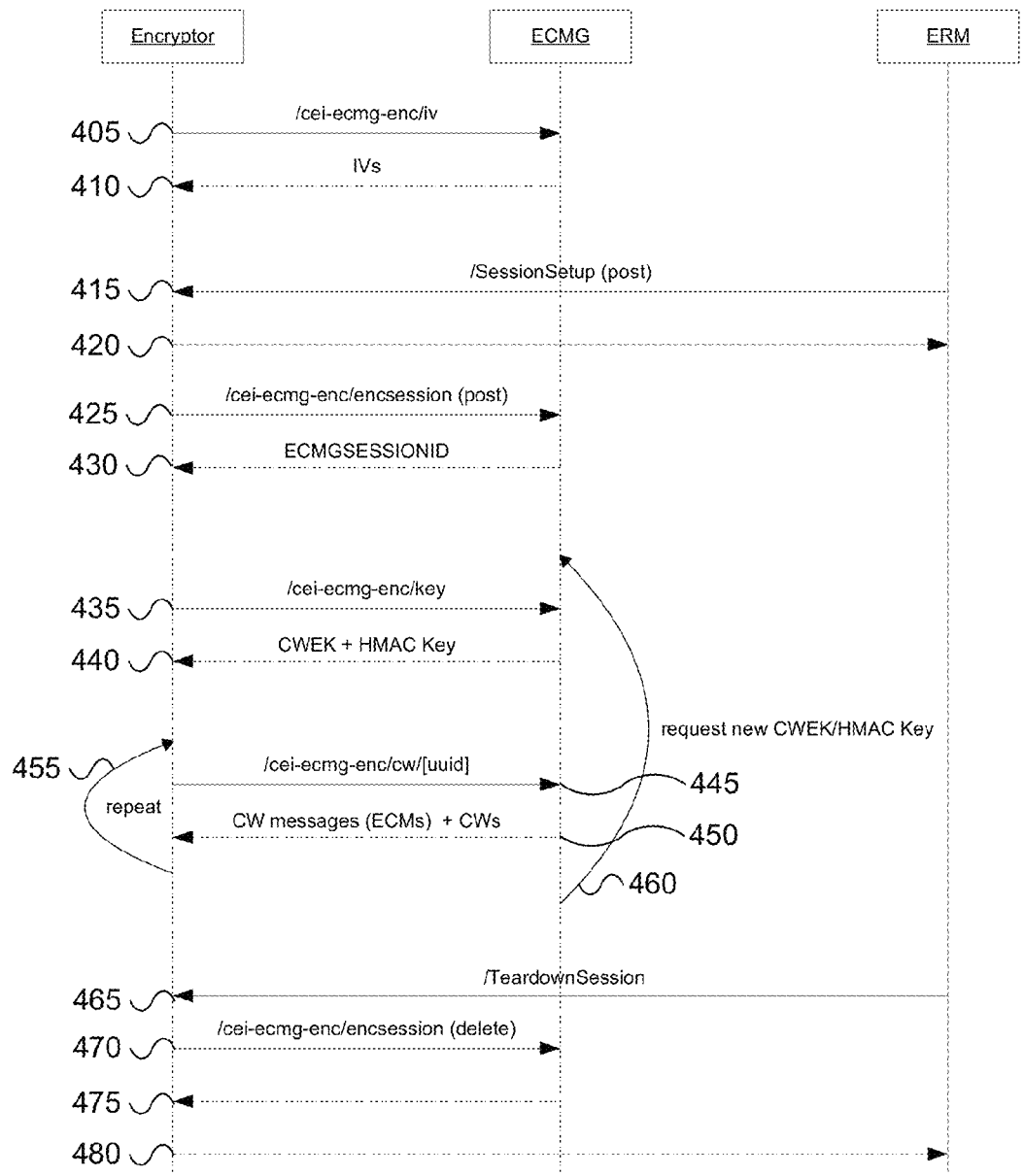
FIG. 4 illustrates a message flow diagram in accordance with one or more illustrative aspects described herein.

FIG. 4 illustrates a message flow diagram in accordance with one or more illustrative aspects described herein. Particularly, FIG. 4 illustrates the message flow between an encryptor (i.e., an EQAM and/or another CCAP device), an ECMG and an ERM.

As seen in FIG. 4, the flow may begin at step 405 in which the encryptor (ENC) of a CCAP encryption infrastructure (CEI) may send a request for initialization vectors (IVs) to the ECMG. For example, in step 405, the encryptor may boot up and connect to the /CEI-ENC-ECMG/IV resource (e.g., a software protocol resource of an API) to retrieve the IVs from the ECMG. In step 410, the ECMG may send a response to the request to the encryptor. For example, in step 410, the ECMG may send the IVs to the encryptor.

In some embodiments, the encryptor may use the IVs to seed an encryption engine such as, for example, the data encryption engine (DES) algorithm. For example, the IVs may be a random or pseudo random number that may be used with secret key (e.g., a DES key). The DES key may be a fixed length 56-bit key. Because the encryptor may be a generic encryption device, the encryptor may need to receive the appropriate set of IVs for the specific encryption algorithms supported for a specific network. The encryptor and the ECMG may perform mutual authentication of the other device in order for the IVs to be transferred from the ECMG to the encryptor. The mutual authentication and exchange of IVs may be performed once since the IVs might not change and because the IVs may be common to all of the streams. In some embodiments, mutual authentication and/or retrieval of IVs may be performed more than once.

In step 415, the ERM may send a SessionSetup request to the encryptor. For example, in step 415, the ERM may send to the encryptor a message including /SessionSetup (post). The /SessionSetup (post) may be a placeholder. In step 420, the encryptor may send to the ERM an acknowledgement that the SessionSetup request has been received.

In step 425, the encryptor may send to the ECMG a request for a new encryption session. For example, in step 425, the encryptor may connect to the /CEI-ENC-ECMG/ENCSESSION (post) resource to initialize the encryption session on the ECMG. The encryption session may permit the encryptor to on an ongoing basis request for control words and associated ECMs from the ECMG.

In step 430, the ECMG may send to the encryptor a response to the request for the new encryption session. For example, in step 430, the ECMG may send to the encryptor a message including ECMGSESSIONID. Because the ECMG and/or the encryptor may be involved with hundreds of sessions and services at the same time, the ECMG session ID may be utilized by the ECMG and/or the encryptor to identify this particular session.

In step 435, the encryptor may send a key request to the ECMG. For example, in step 435, if the encryptor does not have the key names specified in an ENCSESSIONID response, the encryptor connects to the /CEI-ECMG-ENC/ KEY resource to retrieve a control word encryption key (CWEK) and a keyed-hash message authentication code (HMAC) key. In step 440, in response to receiving the request, the ECMG may send to the encryptor the CWEK and HMAC keys. In short, the encryptor and ECMG perform a key exchange for use during the encryption session. In some embodiments, the CWEK and HMAC keys may be used for a length of time without regard to the length of the encryption sessions.

In step 445, the encryptor may send a request for a batch of control words and associated ECMs to the ECMG. For example, in step 445, the encryptor connects to the /CEI-ENC-ECMG/CW (UUID) resource to retrieve the batch of control word messages (e.g., ECMs) and control words for an event. The UUID may be a tag on a particular access criterion as discussed above. The ECMG may generate the batch of control words and associated ECMs based in part on the received UUID.

In step 450, the ECMG may, in response to the request for the batch, send to the encryptor event messages and control word messages (e.g., ECMs) including the control words. Prior to sending the control words, the ECMG may generate and encrypt the control words based on the CWEK key. In some embodiments, the encryptor may, once it receives the control words, decrypt the control words based on the CWEK key.

In step 455, steps 445 and 450 may be repeated. For example, in step 455, the encryptor may send a request for a second batch of control words and associated ECMs to the ECMG. In response, the ECMG may send a second batch of ECMs including control words encrypted based on the CWEK key. In some embodiments, steps 445 and 450 may be repeated for ongoing requests for batches of control words and associated ECMs. In other words, the encryptor repeats requests for batches of control words and associated ECMs as needed. During these repeated requests, the same CWEK key is used by the encryptor and ECMG until the key is changed and/or updated.

In step 460, the CWEK and HMAC keys may be changed and/or updated. For example, in step 460, the encryptor may request for a new key exchange with the ECMG. For example, the encryptor may connect to the /CEI-ENC-ECMG/KEY resource to request new CWEK/HMAC key pairs from the ECMG. The encryptor may send the request for a new key pair in response to the current key pair expiring. Additionally or alternatively, in some embodiments, the encryptor may send the request for the new key pair periodically (e.g., every 10 minutes) and/or after a predetermined threshold number of batches and/or control words have been sent from the ECMG to the encryptor.

Once the request for the new key pairs has been sent from the encryptor to the ECMG, steps 435-455 may be repeated. For example, the encryptor and ECMG may perform a key exchange as shown in steps 435 and 440. Once encryptor has sent its key request to the ECMG and the ECMG has sent its new key pair to the encryptor, the encryptor may send a request for another batch of control words and associated ECMs to the ECMG. In response, the ECMG may send to the encryptor another batch of ECMs including the control words. In some embodiments, the encryptor may send to the ECMG yet another request for a batch of control words and associated ECMs and, in response, may receive yet another batch of ECMs including control words from the ECMG. In some embodiments, the keys may again be updated and/or changed repeatedly.

In step 465, the ERM may begin to tear down the session once a subscriber trims off of a stream. For example, in step 465, the ERM may send to the encryptor a message including /TEARDOWNSESSION. In response, at step 470, the encryptor may send to the ECMG a request to end the session. For example, in step 470, the encryptor may send to the ECMG a message including /CEI-ECMG-ENC/ENC-SESSION (DELETE) to end the session. In step 475, the ECMG may send to the encryptor an acknowledgement that the session has ended. In step 480, the encryptor may then send to the ERM an acknowledgement that the session has ended.

Typically, in conventional headend systems, an encryptor may include a simulcrypt synchronizer component that may behave in accordance with the DVB standard (e.g., for the European Telecommunications Standards Institute (ETSI)). The simulcrypt synchronizer may interact with an ECMG and may retrieve ECM messages proprietary to the conditional access vendor. Typically, the synchronizer may send to the ECMG a request for one ECM and/or one control word. The request may include a designated crypto period (usually between 1 and 10 seconds). Typically, the request might not include a request for a second ECM and/or a second control word. The encryptor may receive from the ECMG one ECM and/or one control word corresponding to one crypto period. The encryptor may then encrypt the transport stream for the length of the crypto period using the control word and insert the ECM including the control word into the QAM channel at the appropriate time. Once sent, the encryptor may then send another request to the ECMG for the next ECM and/or the next control word. Thus, in such conventional systems, the encryptor may frequently (e.g., at least once during each crypto period) send requests to and/or receive ECMs from the ECMG.

Figure 5:
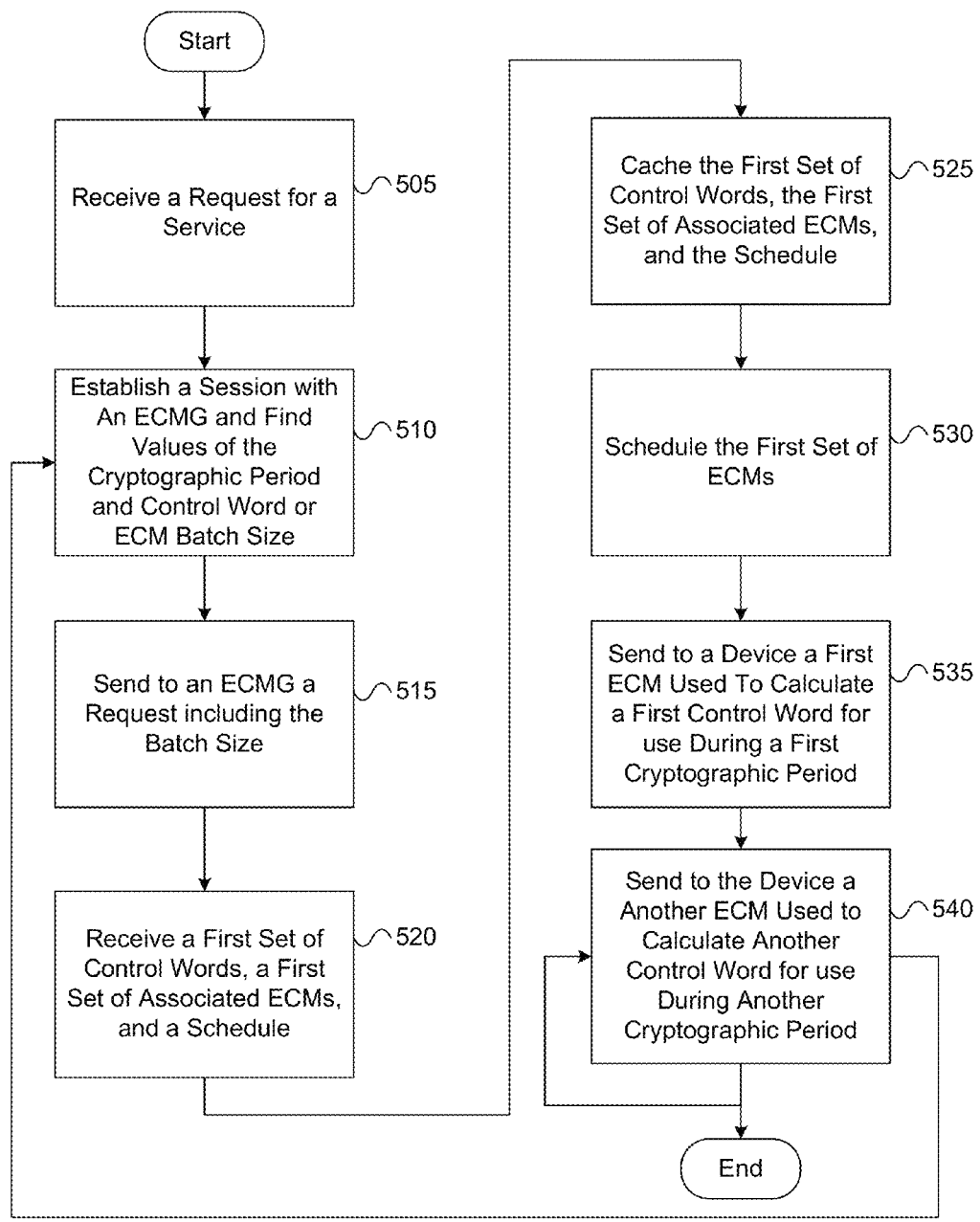
FIG. 5 illustrates a flowchart of an exemplary method of retrieving and using a batch of control words and associated ECMs in accordance with one or more illustrative aspects discussed herein.

FIG. 5 illustrates a flowchart of an exemplary method of retrieving and using a batch of control words and associated ECMs in accordance with one or more illustrative aspects discussed herein. In one or more embodiments, the method of FIG. 5 and/or one or more steps thereof may be performed by a computing device (e.g., computing device 200). In other embodiments, the method illustrated in FIG. 5 and/or one or more steps thereof may be embodied in computer-executable instructions that are stored in a computer-readable medium, such as a non-transitory computer-readable memory.

As seen in FIG. 5, the method may begin at step 505 in which a local office (e.g., a headend) may receive a request for a service. For example, in step 505, a VOD and/or SDV session manager server may receive the request. Additionally or alternatively, a broadcast video service management server may receive the request. In response, the respective server may send an indication of the request to an EQAM via an ERM. The ERM may modify (e.g., add to) the indication. Additionally or alternatively, in some embodiments, the ERM may generate the indication. The indication may include one or more of an identification of the QAM channel to be sent, an identification of the content, an identification of the group of subscribers to which the identified QAM channel is to be sent, and/or an indication of the length of time the service will be sent to the downstream clients (e.g., that the movie is 2 hours in length).

In step 510, the EQAM may learn from an ECMG the crypto period and the batch size values or the number of control words sufficient to stream the service for a predetermined period of time. For example, in step 510, the EQAM may establish a session with an ECMG for the specific service and receive the crypto period and batch size values. In some embodiments, the predetermined period of time may be based on a response time constraint set by the content provider. The content provider may transmit specified durational values to the ECMG. In some embodiments, the ECMG may determine the predetermined period of time based on a number of factors. The predetermined period of time may be based on one or more of the length of the service (e.g., a 2 hour movie), the storage capacity of the EQAM, the bandwidth available to transmit ECMs including control words, and/or the expected availability of a network connection with the EQAM (e.g., a predetermined period of time the network should be providing connectivity). In addition to predetermining the period of time, the ECMG may determine the length of crypto period to be used with the stream. The ECMG may determine the length of the crypto period based on various factors. For example, the crypto period may be set by the content provider. Alternatively, the ECMG may determine the crypto period based on other factors, such as, for example the specific algorithm selected for use by the embedded encryptor of the EQAM for transport stream encryption, how premium the associated content is (e.g., above a predetermined threshold value), and/or the type of entitlement methodology used. The ECMG may then determine, based on the predetermined period of time to stream the service and the length of the crypto period, the batch size or the number of control words sufficient to stream the service for the predetermined period of time. In some embodiments, the number of control words sufficient to stream the service for the predetermined period of time may be at least two control words corresponding to at least two respective crypto periods. Each control word is associated with a crypto period. In other words, the predetermined period of time may be at least two crypto periods.

For example, the predetermined period of time may be equal to the length of time sufficient to stream an entire movie (e.g., 2 hours). The crypto period may be determined to be e.g., 10 seconds in length and/or any other amount of time. Since there are 7,200 seconds in the 2 hour movie and the crypto period is 10 seconds in duration, the ECMG may determine that the number of control words sufficient to stream the entire movie is 720 control words corresponding to 720 crypto periods and 720 associated ECMs.

For example, the predetermined period of time may be a small subset (e.g., 10 min) of the movie. The crypto period may be determined to be 1 second and/or any other amount of time. The crypto period may vary based on the sensitivity of the content. A shorter crypto period may be used to increase security. Since there are 600 seconds in 10 minutes and the crypto period is e.g., 1 second in duration, the ECMG may determine and indicate to the EQAM that the number of control words sufficient to stream the 10 minute section of the movie is 600 control words corresponding to 600 crypto periods and 600 associated ECMs.

In step 515, the EQAM may send to an ECMG a request for the determined number (e.g., a batch size) of control words. In some embodiments, the request may be for two or more control words corresponding to two or more respective crypto periods and two or more associated ECMs. Following the above examples, the request may be for 720 control words sufficient to stream the two hour movie and/or may be for 600 control words sufficient to stream ten minutes of the movie. In some embodiments, the request may be for one control word. In some embodiments, the ECMG may specify to an EQAM a range for the control word batch size to use. For example, the ECMG may specify to an EQAM a minimum batch size and a maximum batch size for requesting control words. In this case, in step 515, the EQAM may send to an ECMG a request for a number of control words, with the number falling between the minimum and maximum batch sizes.

In response to receiving the request, the ECMG may generate a first set of control words and a first set of associated ECMs based on the requested number of control words. The ECMG may also generate a schedule of when each ECM should be sent to the downstream clients (e.g., by inserting the ECM into the service and/or stream on a channel). The schedule may also indicate which control word the EQAM should use at a given point in time to scramble the service. The schedule may be in any form used to select the appropriate control word and associated ECM including, for example, a table, an index, an algorithm, and the like. In some embodiments, the schedule might not be sent to the downstream client devices. In such embodiments, the downstream client devices may select the control word for descrambling the service based on the order in which the ECM was received in the stream from the EQAM.

In some embodiments, the ECMG may generate the control words in accordance with a data encryption standard (DES), a triple data encryption standard (triple DES), an advanced encryption standard (AES), and/or another encryption standard. For example, for use with the DES algorithm in the EQAM, the ECMG may create a 56-bit key, a 64-bit key, or some other size encryption key. For example, for use with the triple DES algorithm in the EQAM, the ECMG may create 112 bit key, a 128 bit key, or some other size encryption key.

In some embodiments, the ECMG may individually manage each service and/or stream via the access criteria associated with the content. Based on the access criteria associated with the content, the ECMG may determine the values of crypto period and/or control word batch size to be used by the EQAM, for the service. For example, because the ECMG may have received an indication as to which algorithm to use for transport stream encryption and/or sensitivity of the content in the access criteria, the ECMG may alter the crypto period and accordingly the control word batch size. The ECMG may increase or lengthen the crypto period and accordingly may decrease the control word batch size when, for example, the algorithm to be used for transport stream encryption is considered more secure. Additionally or alternatively, in some embodiments, the ECMG may decrease or shorten the crypto period and accordingly may increase the control word batch size when, for example, the content associated with the service is more sensitive.

In step 520, the EQAM may receive the first set of ECMs with each ECM associated with a different control word. The EQAM may also receive the schedule of the first set for use in scheduling the usage of control words in encrypting the transport stream and the transmission of the ECMs in the transport stream to the downstream clients. In some embodiments, in step 520, the EQAM may receive the first set of ECMs with one or more of the ECMs of the first set of ECMS being associated with the same control word.

In step 525, the EQAM may cache the first set of ECMs including the control words as well as the schedule. For example, in step 525, the EQAM may concurrently cache or store at the EQAM at least two ECMs including at least two respective control words. Following the above example, the EQAM may concurrently cache 720 ECMs and associated control words for a movie. Because each ECM and control word is associated with a different crypto period, the EQAM has cached sufficient ECMs and control words for 720 different crypto periods (which coincides in length with the two hour movie). Following the other above example, the EQAM may concurrently cache 600 ECMs and associated control words for a ten minute segment of the movie. Thus, the EQAM has cached sufficient ECMs and control words for 600 different crypto periods (which coincides in length with the 10 minute segment of the movie).

The EQAM may scramble the content of a stream based on a control word during a particular crypto period. For example, during a first crypto period, the EQAM may scramble the movie on the stream based on a first control word. Similarly, during a second crypto period, the EQAM may scramble the movie on the stream based on a second control word. The EQAM may repeatedly scramble the movie on the stream with a different control word for each different crypto period in accordance with the received schedule.

In step 530, the EQAM may schedule the first set of ECMs for use with multiple different crypto periods. For example, in step 530, the EQAM may schedule transmission of each ECM to the downstream client devices based on the received schedule.

In step 535, the EQAM may send to the downstream client devices a first ECM of the first set of ECMs in accordance with the schedule. For example, in step 535, the EQAM may send to the downstream client devices the first ECM for use during the first crypto period. For example, the EQAM may insert the first ECM into a stream or service of a specified channel (e.g., a QAM channel) at the appropriate time which may be determined based on the received schedule. The downstream client devices may receive the service or stream including the ECMs. The downstream client devices may use the first control word calculated from the first ECM to descramble the stream or service during the first crypto period.

In step 540, the EQAM may send to the downstream client devices another (e.g., a second) ECM of the first set of ECMs in accordance with the schedule. For example, in step 540, the EQAM may send to the downstream client devices the second ECM for use during the second crypto period. For example, the EQAM may insert the second ECM into the stream or service of the specified channel (e.g., the QAM channel) at the appropriate time which may be determined based on the received schedule. The downstream client devices may receive the service or stream including the ECMs. The downstream client devices may use the second control word calculated from the second ECM to descramble the stream or service during the second crypto period.

Accordingly, a particular downstream client device may receive and store two ECMs. For example, the particular downstream client may store an ECM to calculate the control word currently in use to descramble a service during a particular crypto period. The particular downstream client may also store, during the particular crypto period, another ECM to calculate another control word for use with the next crypto period. Thus, the downstream client devices may receive the ECMs in the transport stream in real-time and the ECMs get used in real-time. Hence, there might not be a need for the client devices to store ECMs beyond the current crypto period.

The EQAM may, based on the schedule, send a particular ECM to downstream client devices one crypto period prior to the crypto period for which the control word of that ECM is to be used to descramble the stream or service. For example, the EQAM may send the second ECM to the downstream devices during the first crypto period. This ensures that the second ECM including the second control word has been received by the downstream devices prior to the second crypto period during which the second control word may be used by the downstream devices to descramble the stream or service. In other words, the schedule may indicate when each ECM is to be sent to the downstream client devices resulting in each ECM being sent to the downstream client devices one crypto period before use by the downstream client devices. The client devices may select a control word to descramble the content based on the received order of the associated ECMs.

Step 540 may be repeated to accommodate more control words and associated ECMs. For example, the EQAM may repeatedly send each ECM of the first set of ECMs to the downstream client devices in accordance with the received schedule. For example, a third ECM used to calculate a third control word for use during a third crypto period may be sent to the client devices during a second crypto period.

The steps of 510-540 may be repeated. Following the above example regarding the ten minute segment of the movie, steps 510-540 may be repeated for another segment of the movie. Specifically, the EQAM may determine a number of control words sufficient to stream a service for a second predetermined period of time (which may be different from the original ten minute period of time). The EQAM may send to the ECMG a second request including the second determined number of control words. In response, the EQAM may receive a second set of ECMs including an associated second set of control words and a second schedule for scheduling transmission of the second set of ECMs to the downstream client devices. A number of ECMs included in the second set of ECMs may be different from a number of ECMs included in the first set of ECMs. The EQAM may cache concurrently the second set of ECMs including the controls words as well as the second schedule. The EQAM may schedule sending of each ECM of the second set of ECMs to the downstream client devices based on the second schedule. The EQAM may send a first ECM of the second set of ECMs to the downstream client devices. The first ECM may be used to calculate a first control word for use during a particular crypto period. The EQAM may send a second ECM of the second set of ECMs to the downstream client devices. The second ECM may be used to calculate a second control word for use during a different particular crypto period. The EQAM may repeatedly send ECMs of the second set of ECMs to the downstream client device according to the second schedule. The EQAM may send each ECM to the downstream client devices one crypto period prior to the crypto period corresponding to that ECM. In some embodiments, the EQAM may send each ECM to the downstream client devices two or more crypto periods prior to the crypto period corresponding to that ECM. The steps of 510-540 may again be repeated for another segment of a stream or service (e.g., another segment of the movie).

By requesting and receiving ECMs including control words in batch sets, the EQAM might not need to send requests for the ECMs and control words as often. As a result, the EQAM minimizes its bandwidth needs because it does not send requests to the ECMG as frequently as is done in conventional systems. For example, the EQAM might not send the requests every crypto period.

The downstream client devices may receive entitlement management messages (EMMs) from e.g., one or more components described in FIG. 3 discussed above. An EMM may include the rights to access certain streams being broadcast or otherwise sent (e.g., in a VOD stream) to the downstream client devices. The rights to access may be subscriber and/or device specific. In other words, the downstream client devices may receive authorization and/or permission to receive a service or channel based on the rights to access the service sent in the EMM. Thus, the downstream client device may prevent viewing and/or access to the service or channel if the downstream client device determines that it is not authorized to view the service or channel. In some embodiments, the EMM may include a session key as discussed above. In such embodiments, the ECMG may produce the ECMs based on the session key. The downstream client devices may apply the session key to the ECMs to obtain the respective control word to descramble the service and/or stream.

In some embodiments, the crypto period may be constant. In other embodiments, the crypto period may dynamically change. In such other embodiments, at least one of the ECM and/or the EMM may include an indication of the new duration of the crypto period such that the downstream client devices may utilize the next control word for the appropriate duration.

In conventional systems, ECMs may be requested by an encryptor one crypto period at a time. When the encryptor sends a request for the next ECM to the ECMG and may, in response, receive the next ECM from ECMG, the time period from when the request was sent until the next ECM is received may be referred to as a latency time. Thus, in conventional systems, because the encryptor may send a request for the next control word to the ECMG every crypto period, a resulting latency time in receiving a next ECM may be greater than the crypto period. In other words, the latency time in receiving a next ECM might not be less than the crypto period and service disruption would result from a gap in time between end of one crypto period and receiving the next ECM for the next crypto period.

As discussed above, in this system and methodology, the EQAM may concurrently cache the first set of ECMs including the respective first set of control words. For example, the EQAM may concurrently store at least four ECMs respectively including at least four control words. Because the ECMs (and/or control words) may be concurrently stored at the EQAM, the crypto period of the ECMs stored at the EQAM may be less than the latency time in receiving a new ECM. For example, the EQAM may use the third ECM including the third control word at any point in time since the third ECM is already stored at the EQAM (e.g., the EQAM might not have to go back and request the third ECM from the ECMG while the second control word for use with the second crypto period is currently in use). Thus, the second crypto period may be of duration less than a latency time to receive a new ECM at the EQAM since the EQAM has already cached the third ECM and, thus, might not have to request the third ECM during the second crypto period.

Figure 6:
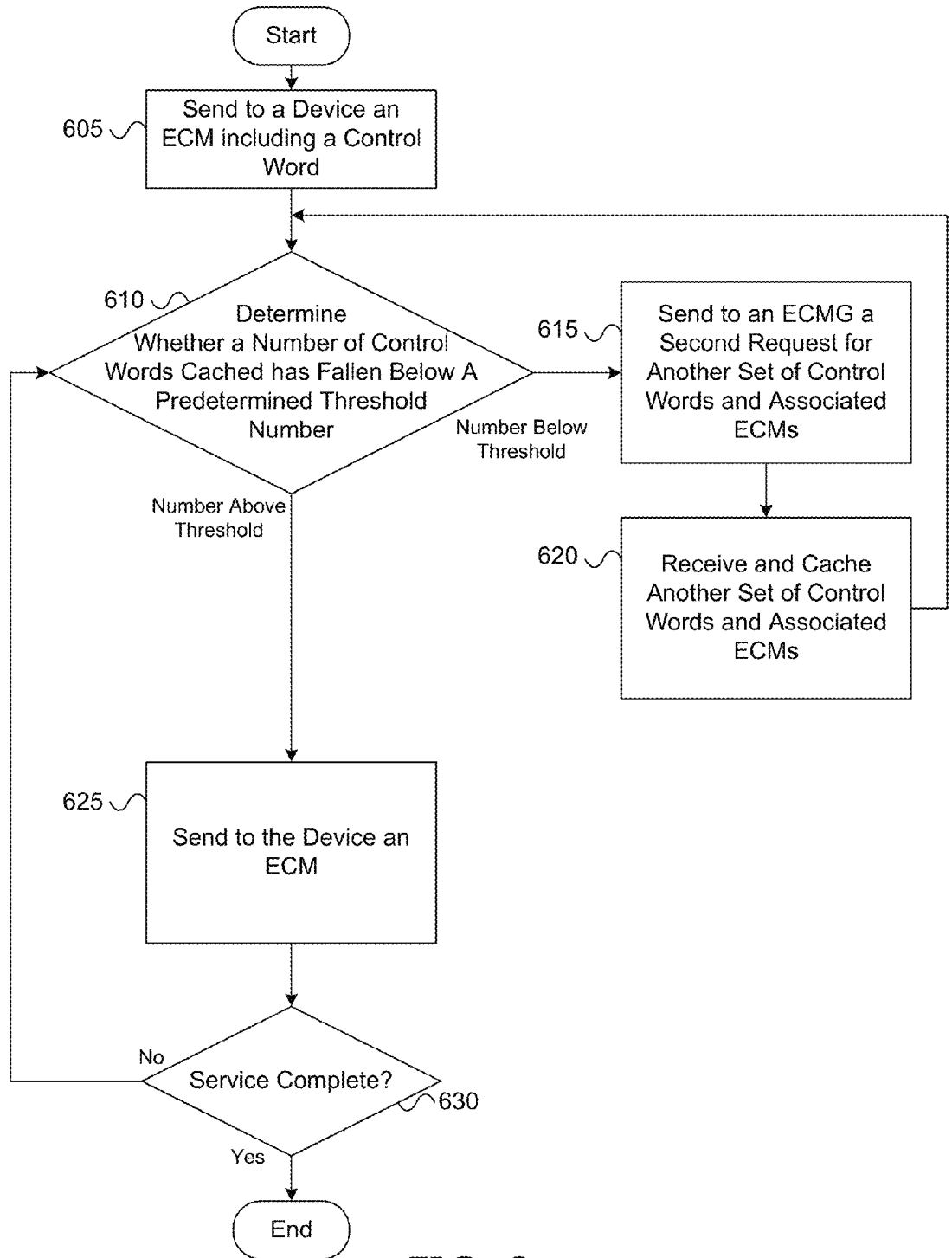
FIG. 6 illustrates a flowchart of an exemplary method of maintaining a threshold number of control words and associated ECMs in accordance with one or more illustrative aspects discussed herein.

FIG. 6 illustrates a flowchart of an exemplary method of maintaining a threshold number of control words and associated ECMs in accordance with one or more illustrative aspects discussed herein. In one or more embodiments, the method of FIG. 6 and/or one or more steps thereof may be performed by a computing device (e.g., computing device 200). In other embodiments, the method illustrated in FIG. 6 and/or one or more steps thereof may be embodied in computer-executable instructions that are stored in a computer-readable medium, such as a non-transitory computer-readable memory.

As seen in FIG. 6, the method may begin at step 605 in which an EQAM may send to a downstream client device an ECM including a control word. For example, in step 605, the EQAM may send a first ECM of a first set (e.g., a first batch) of ECMs to the downstream client devices. The first ECM may be used to calculate a first control word for use during a first crypto period and/or another crypto period.

In step 610, the EQAM may determine whether to request a second set (e.g., another batch) of control words. For example, in step 610, once an ECM has been sent to the client devices, the EQAM may determine whether a number of control words currently cached at the EQAM have fallen below a predetermined threshold number (e.g., set by a user and/or by the EQAM based on one or more of available memory, load balancing, and available bandwidth). In some embodiments, after an ECM is sent from the EQAM to the downstream client devices, the sent ECM including the associated control word might no longer be cached at the EQAM. In such embodiments, the EQAM may determine the number of control words (and/or ECMs) still cached at the ECM and compare the determined number with a predetermined threshold number.

Additionally or alternatively, in some embodiments, the EQAM may copy the ECM including the control word prior to sending the ECM to the downstream client devices. In such embodiments, the EQAM may retain (i.e., maintain) the copy of the ECM including the control word for later use (e.g., for reuse during a subsequent crypto period). In determining whether the number of control words currently cached at the EQAM has fallen below a predetermined threshold value, the EQAM might not take into account the retained cached copy of the sent ECM including the control word. As a result, the EQAM may determine the number of control words based on the number of control words cached at the EQAM and not yet sent to the downstream client devices (e.g., not taking into account the retained copies). The EQAM may compare the determined number of control words with the predetermined threshold number. In some embodiments, the EQAM and/or a user may set the predetermined threshold number of ECMs and/or control words.

In step 625, the EQAM may send to the downstream client device the next scheduled ECM. For example, in step 625, in response to a determination that the determined number of control words is above (i.e., a number greater than) the predetermined threshold number, the EQAM may send to the downstream client devices the next scheduled ECM used to calculate the next control word for use during the next crypto period.

In step 630, the EQAM may determine whether service is complete. For example, in step 630, the EQAM and/or an ERM may determine whether an ordered movie is complete and/or when the subscriber changes the channel. In response to a determination that the service is complete, the ERM may initiate a teardown of a session as discussed above in connection with FIG. 4. In response to a determination that the service is not yet complete (e.g., the movie has not been completed), the method may return to step 610. Particularly, the EQAM may again determine whether a number of control words cached at the EQAM have fallen below the predetermined threshold number.

In step 615, the EQAM may send a request for another batch of control words. For example, in step 615, in response to a determination that the determined number of control words is equal to or below (i.e., a number less than or equal to) the predetermined threshold number, the EQAM may send to an ECMG a second request for a second set of ECMs and control words. The request may include a requested number of ECMs and/or control words, an indication of the crypto period duration, an indication of the service or its sensitivity, and/or an indication of the number of control words (or ECMs) of the first set of ECMs currently cached at the EQAM (and optionally including the number of retained copies of ECMs including control words). The ECMG may generate a second set of ECMs including control words as well as a schedule for the second set of ECMs. The ECMG, in some embodiments, may alter the number of ECMs in the second set based on e.g., the sensitivity of the service.

In generating the schedule for the second set of ECMs and control words, the ECMG may account for the number of control words (or ECMs) of the first set of ECMs currently cached at the EQAM (and optionally including the number of retained copies of ECMs including control words). For example, the schedule may indicate that the first ECM of the second set of ECM is to be sent after the last ECM of the first set of ECMs. In some embodiments, the second schedule may alter and/or update the first schedule.

In step 620, the EQAM may receive the second set of ECMs and the schedule for the second set of ECMs. For example, in step 620, the EQAM may cache the second set of ECMs including control words and the schedule for the second set of ECMs. The second set of ECMs including the control words may include at least two ECMs including at least two respective control words. For example, the second set of ECMs and control words may include 1,000 ECMs and control words.

In some embodiments, once the second set of ECMs is received, the EQAM may verify that the total number of ECMs currently cached at the EQAM is now above the predetermined threshold holder number. In other words, step 610 may be repeated. For example, in step 625, the EQAM may send another ECM to calculate a control word to the downstream client devices. For example, in step 625, the EQAM may send another ECM of the first set of ECMs. In such an example, the ECM of the first set of ECMs may be a remaining unused ECM of the first set of ECMs and/or a copy of a used ECM of the first set of ECMs. For example, in step 625, the EQAM may send an ECM of the second set of ECMs. Returning to step 630, if the service is not completed, steps 610-630 may be repeated until the service is complete.

As a result of receiving and caching another (e.g., a second) set of ECMs respectively including another (e.g., a second) set of control words, the EQAM may prestore the second set of ECMs prior to using all of the first set of ECMs. For example, the EQAM (e.g., an intermediary device) may prestore a first set of ECMs. As shown in step 605 and 625, the EQAM may send particular ones of the first set of ECMs to client devices (e.g., devices downstream of the intermediary device). As shown in steps 610-620, the EQAM may prestore a second set of ECMs prior to using (e.g., sending to the client devices) all of the first set of ECMs.

In some embodiments, because each EQAM may have constraints on the maximum number of ECMs and control words the EQAM may cache or store, the EQAM may specify in its requests to the ECMG that the requested set (e.g., batch) of ECMs including respective control words not exceed a number of ECMs including respective control words specified in the request. In other words, the request may specify a maximum number of ECMs and/or control words. In some embodiments, in the event that the received set of ECMs from the ECMG is greater than the maximum number allocated, the EQAM may reject the set of ECMs and resend another request to the ECMG. In some embodiments, in response to a determination that a number of control words and associated ECMs currently cached at the EQAM is above a predetermined threshold number, the EQAM may prevent (e.g., reject) reception of control words and associated ECMs from the ECMG until the number of control words and associated ECMs has fallen below the predetermined threshold number. In such embodiments, the EQAM may send an indication of the rejection to the ECMG.

In some embodiments, the ECMG may generate two types of ECMs for inclusion in a set of ECMs. A first type of ECM may be a program wiki message that may include rights information so that when a downstream client device receives such an ECM, the downstream client device may match the received rights information with rights information received in an entitlement management message (EMM). A second type of ECM may be a message including one control word or, in some embodiments, multiple control words. The EQAM may send each type of ECM to the downstream client devices together.

In some embodiments, the bit length of the ECMs may vary. For example, an ECM may range between 50 bytes and several hundred bytes. The downstream client devices may include multiple different types of devices. Each different type of downstream client device may require a different type and/or size of ECM. For example, a set-top box may be able to utilize an ECM of a first size while a DTA may be able to utilize an ECM of a second size different from the first size. In the event the EQAM is sending ECMs to a mixed population of devices (e.g., in a broadcast scenario where some downstream client devices may be set-top boxes while others may be DTAs), the EQAM may send both types of ECMs so that each downstream client device may utilize the ECM it understands. In the event the EQAM is sending ECMs to one type of device (e.g., in a VOD service, the downstream client device may be known to be a set-top box); the EQAM may send only the particular type of ECM that the downstream client device may understand. In some embodiments, the ECMG may generate the schedule to accommodate one or more types of ECMs. Thus, the schedule may be a multidimensional table based on device-type.

In some embodiments, the streams may be sent by the EQAM to downstream client devices of any service provider. In other words, the EQAM of a first service provider may provide service to a customer of a second service provider. The schedule (e.g., the multidimensional table) may additionally account for the different types of conditional access systems for each service provider and information about the receiving downstream client devices. In some embodiments, the encryption and/or scrambling aspects of the EQAM may be standardized so that the EQAM may be a universal encryptor for multiple CA systems spanning multiple service providers.

Figure 7:
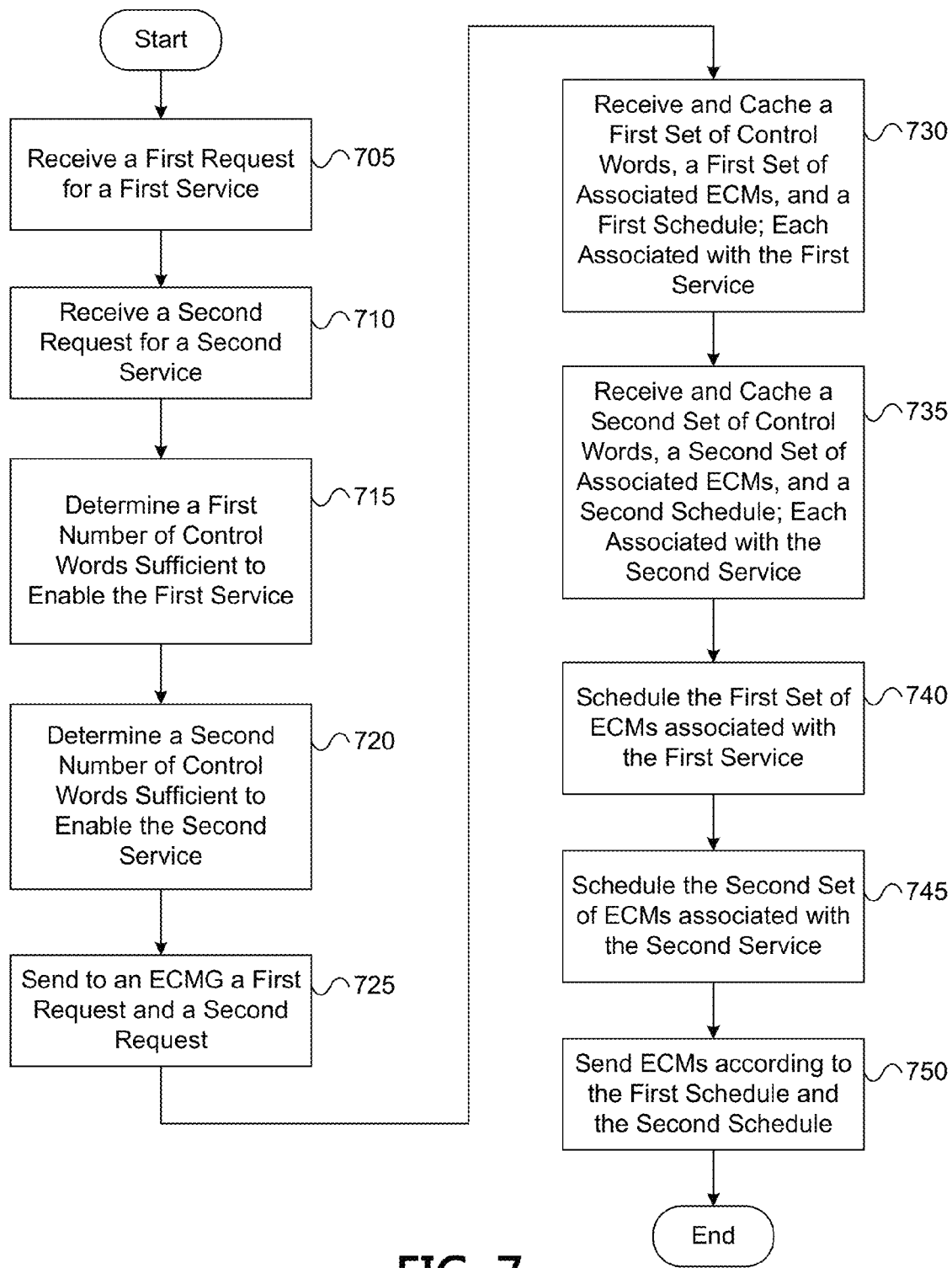
FIG. 7 illustrates a flowchart of an exemplary method of retrieving and using multiple batches of control words and associated ECMs for use with multiple services in accordance with one or more illustrative aspects discussed herein.

FIG. 7 illustrates a flowchart of an exemplary method of retrieving and using multiple batches of control words and associated ECMs for use with multiple services in accordance with one or more illustrative aspects discussed herein. In one or more embodiments, the method of FIG. 7 and/or one or more steps thereof may be performed by a computing device (e.g., computing device 200). In other embodiments, the method illustrated in FIG. 7 and/or one or more steps thereof may be embodied in computer-executable instructions that are stored in a computer-readable medium, such as a non-transitory computer-readable memory.

As seen in FIG. 7, the method may begin at step 705 in which a local office (e.g., a headend) may receive a first request for a service from a first client device. For example, in step 705, a VOD and/or SDV session manager server may receive the first request. Additionally or alternatively, a broadcast video service management server may receive the first request. In response, the respective server may send a first indication of the first request to an EQAM via an ERM. The ERM may modify (e.g., add to) the first indication. Additionally or alternatively, in some embodiments, the ERM may generate the first indication. The first indication may include one or more of an identification of the first QAM channel to be sent, an identification of the first content, an identification of the first group of subscribers to which the identified first QAM channel is to be sent, and/or an indication of the length of time the first service will be sent to the downstream clients (e.g., that the movie is 2 hour in length).

In step 710, the local office (e.g., the headend) may receive a second request for a second service from a second client device. The second service may be different from the first service. The second client device may be different from or the same as the first client device. For example, in step 710, the VOD and/or SDV session manager server may receive the second request. Additionally or alternatively, the broadcast video service management server may receive the second request. In response, the respective server may send a second indication of the second request to the EQAM via the ERM. The ERM may modify (e.g., add to) the second indication. Additionally or alternatively, in some embodiments, the ERM may generate the second indication. The second indication may include one or more of an identification of the second QAM channel to be sent, an identification of the second content, an identification of the first group (or a second different group) of subscribers to which the identified second QAM channel is to be sent, and/or an indication of the length of time the second service will be sent to the downstream clients (e.g., that the movie is 2 hour in length).

In step 715, the EQAM may determine a first number of control words sufficient to enable (e.g., stream) the first service for a first predetermined period of time. For example, in step 715, the EQAM may determine the first predetermined period of time. The first predetermined period of time may be specified by a user and/or may be determined based on a number of factors. The first predetermined period of time may be based on one or more of the length of the first service (e.g., a 2 hour movie), the available storage capacity of the EQAM, the bandwidth available to transmit ECMs including control words, and/or the expected availability of a network connection with the ECMG. Once the first predetermined period of time has been set, the EQAM may determine the length of cryptographic period to be used with the first stream. The EQAM may then determine, based on the first predetermined period of time to stream the first service and the length of the crypto period, the first number of control words sufficient to stream the first service for the first predetermined period of time. In some embodiments, the first number of control words sufficient to stream the first service for the predetermined period of time may be at least two control words corresponding to at least two respective crypto periods. In other words, the first predetermined period of time may be at least two crypto periods.

In step 720, the EQAM may determine a second number of control words sufficient to enable (e.g., stream) the second service for a second predetermined period of time. For example, in step 720, the EQAM may determine the second predetermined period of time. The second predetermined period of time may be specified by a user and/or may be determined based on a number of factors. The second predetermined period of time may be based on one or more of the length of the second service (e.g., a 2 hour movie), the available storage capacity of the EQAM, the bandwidth available to transmit ECMs including control words, and/or the expected availability of a network connection with the ECMG. Once the second predetermined period of time has been set, the EQAM may determine the length of crypto period to be used with the second stream. The EQAM may then determine, based on the second predetermined period of time to stream the second service and the length of the cryptographic period, the second number of control words sufficient to stream the second service for the second predetermined period of time. In some embodiments, the second number of control words sufficient to stream the second service for the second predetermined period of time may be at least two control words corresponding to at least two respective crypto periods. In other words, the second predetermined period of time may be at least two cryptographic periods.

In step 725, the EQAM may send to an ECMG multiple requests for control words where at least some of those requests correspond to different services. For example, in step 725, the EQAM may send to an ECMG the first request for the first determined number of control words (e.g., a first batch of control words). The first request may be associated with the first service. In some embodiments, the first request may be for at least two control words corresponding to at least two respective crypto periods for use with the first service. For example, in step 725, the EQAM may send to the ECMG the second request for the second determined number of control words (e.g., a second batch of control words). The second request may be associated with the second service. In some embodiments, the second request may be for at least two control words corresponding to at least two respective crypto periods for use with the second service.

In response to receiving the request, the ECMG may generate multiple sets of ECMs where at least some of the sets are for use with different services. For example, the ECMG may generate a first set of control words and a first set of associated ECMs based on the first requested number of control words for use with the first service. The ECMG may also generate a first schedule of when each ECM used to calculate the control word should be sent to the downstream clients (e.g., by inserting the ECM into the first service and/or first stream on a first channel). The first schedule may also indicate which control word the EQAM should use at a given point in time to scramble the first service. For example, the ECMG may generate a second set of control words and a second set of associated ECMs based on the second requested number of control words for use with the second service. The ECMG may also generate a second schedule of when each ECM used to calculate the control word should be sent to the downstream clients (e.g., by inserting the ECM into the second service and/or second stream on a second channel). The second schedule may also indicate which control word the EQAM should use at a given point in time to scramble the second service.

In step 730, the EQAM may receive and cache the first set of ECMs with each ECM associated with a different control word for use with the first service. The EQAM may also receive and cache the first schedule of the first set for use in scheduling the usage of control words in encrypting the first transport stream and the transmission of the ECMs in the first transport stream to the downstream clients. In some embodiments, in step 730, the EQAM may receive the first set of ECMs with one or more of the ECMs of the first set of ECMs being associated with the same control word.

Similarly, in step 735, the EQAM may receive and cache the second set of ECMs with each ECM associated with a different control word for use with the second service. The EQAM may also receive and cache the second schedule of the second set for use in scheduling the usage of control words in encrypting the second transport stream and the transmission of the ECMs in the second transport stream to the downstream clients.

Accordingly, the EQAM may receive and cache multiple sets of ECMs where at least some of those sets correspond to different services. For example, the EQAM may cache, for each particular service of the multiple services supported by the EQAM, one or more corresponding sets of ECMs including one or more respective control words for use with the particular service. For example, the EQAM may concurrently cache or store at the EQAM at least two ECMs and at least two control words for use with the first service and may also concurrently cache or store at least two ECMs and at least two control words for use with the second service.

In step 740, the EQAM may schedule the first set of ECMs, associated with the first service, for use with multiple different crypto periods. For example, in step 740, the EQAM may schedule usage of each control word in encrypting the first transport stream and the insertion of the corresponding ECM in the first transport stream for transmission to the downstream client devices based on the received first schedule.

In step 745, the EQAM may schedule the second set of ECMs, associated with the second service, for use with multiple different crypto periods. For example, in step 740, the EQAM may schedule usage of each control word in encrypting the second transport stream and the insertion of the corresponding ECM in the second transport stream for transmission to the downstream client devices based on the received second schedule.

In step 750, the EQAM may send to the downstream client devices the ECMs according to their respective schedules. For example, EQAM may send the ECMs of the first set according to the first schedule by inserting an ECM of the first set into the first channel at an appropriate scheduled time. For example, EQAM may send the ECMs of the second set according to the second schedule by inserting an ECM of the second set into the second channel at an appropriate scheduled time. In some embodiments, the second schedule is independent of the first schedule. For example, the EQAM may send an ECM associated the second service prior to or during the sending of an ECM associated with the first service.

In some embodiments, the EQAM may request for additional batches of ECMs and associated control words for one or more of the services. In response, the EQAM may receive from the ECMG additional batches of ECMs and associated control words for use with one or more of the services.

Figure 8:
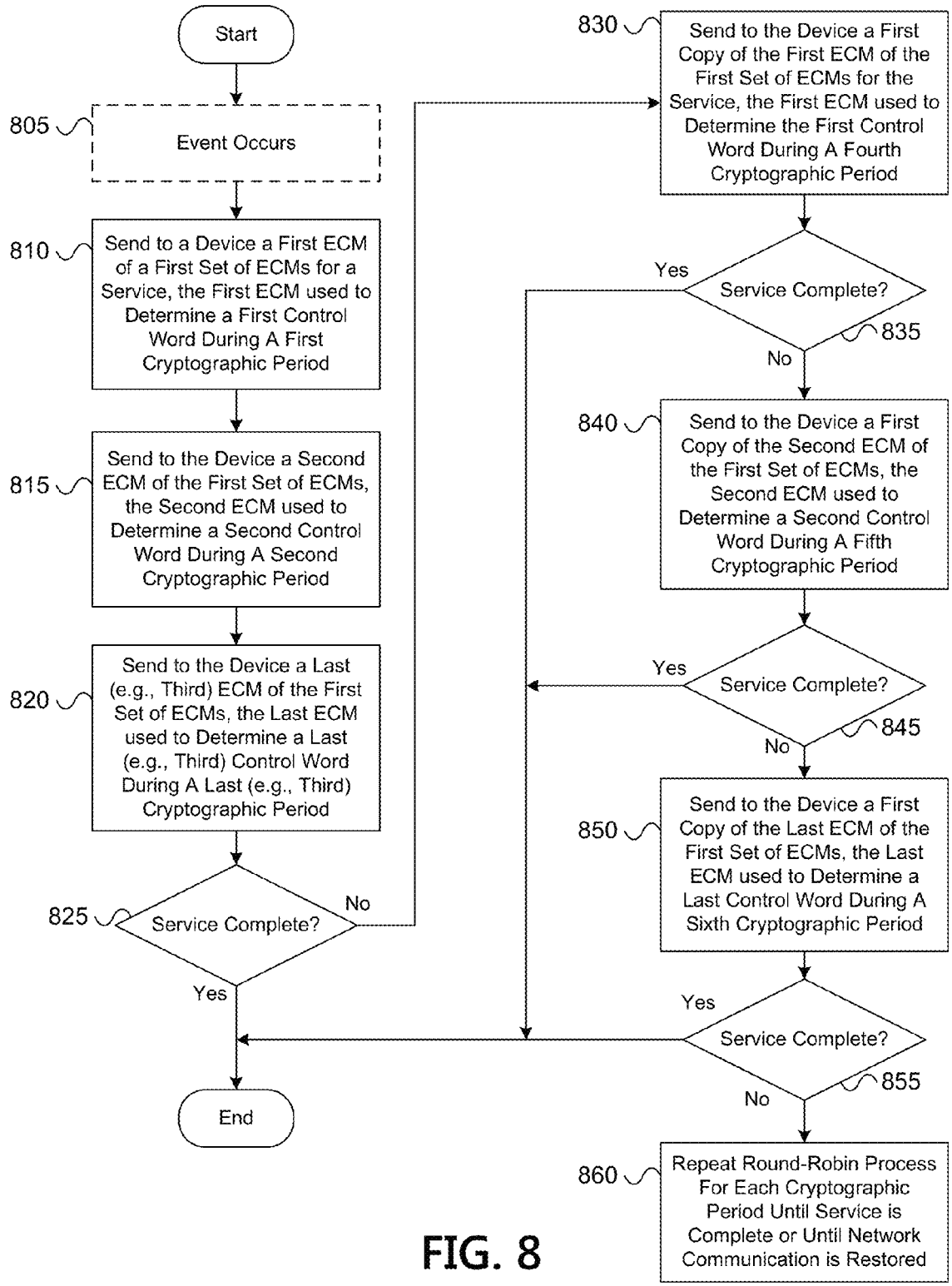
FIG. 8 illustrates a flowchart of an exemplary method of reusing control words and associated ECMs via a round-robin approach in accordance with one or more illustrative aspects discussed herein.

FIG. 8 illustrates a flowchart of an exemplary method of reusing control words and associated ECMs via a round-robin approach in accordance with one or more illustrative aspects discussed herein. In one or more embodiments, the method of FIG. 8 and/or one or more steps thereof may be performed by a computing device (e.g., computing device 200). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 805 in which an occurrence of an event may trigger potential reuse of ECMs. For example, in step 805, the event may be a network failure between the EQAM and an ECMG. Thus, the EQAM might not be able to request and/or receive additional ECMs and/or control words from the ECMG during a network failure. Accordingly, an EQAM may, in response to detecting the network failure, determine whether to eventually reuse one or more control words. The EQAM may make the determination based on whether there are sufficient remaining control words cached at the EQAM to stream the service until completion. In response to a determination that there may be sufficient ECMs to stream the service until completion, the EQAM may perform steps 810-820 as will be described in further detail below.

Prior to the occurrence of the event (e.g., a network outage between the EQAM and the ECMG), the EQAM may encrypt the transport stream using the appropriate control word and insert the associated ECM into the transport stream sent to the downstream client device in accordance with any of the message flows and/or methods described above e.g., in FIGS. 3-8. After the occurrence of the network outage between the EQAM and the ECMG, the EQAM may continue to encrypt the transport stream and continue to send ECMs to the downstream client devices in accordance with any of the message flows and/or methods described above e.g., in FIGS. 3-8. In such embodiments, the EQAM may produce a copy of the sent ECMs and associated control words for reuse. Thus, the EQAM may continue to cache each ECM of a set of ECMs even if an ECM of the set of ECMs has been sent to the downstream client devices (by e.g., retaining a copy of each sent ECM).

In response to a determination by the ECMG that there may be insufficient ECMs to stream the service until completion, the ECMG may signal the EQAM to perform steps 810-860 as will be described in further detail below. For example, the EQAM may copy each remaining cached ECM including the control words if each ECM has not already been copied (i.e., cached) by the EQAM. In some embodiments, the EQAM may copy each ECM of a set of ECMs prior to sending the particular ECM to the downstream device.

In step 810, the EQAM may send an ECM to the downstream client devices. For example, in step 810, the EQAM may encrypt a transport stream for a first crypto period using a first control word. The EQAM may insert a first ECM of a first set of ECMs for a service into the encrypted transport stream it sends to the downstream client devices. The first ECM may include the first control word or may otherwise include information used to derive the first control word. Once the downstream client devices receive the transport stream, the downstream client devices may derive the first control word using the first ECM and may descramble the service (e.g., the encrypted transport stream) using the first control word during a first crypto period of the downstream client devices. As discussed above, the sequence of crypto periods at the EQAM is independent of the sequence of crypto periods at the downstream client devices.

In step 815, the EQAM may send another ECM to the downstream client devices. For example, in step 815, the EQAM may encrypt the transport stream for a second crypto period using a second control word. The EQAM may insert a second ECM of the first set of ECMs for the service into the encrypted transport stream it sends to the downstream client devices. The second ECM may include the second control word or may otherwise include information used to derive the second control word. The downstream client devices may derive the second control word using the second ECM and may descramble the service (e.g., the encrypted transport stream) using the second control word during a second crypto period after the downstream client devices have received the transport stream.

In step 820, the EQAM may send the last ECM to the downstream client devices. For example, in step 820, the EQAM may encrypt the transport stream for a last crypto period using a last control word. The EQAM may insert the last ECM of the first set of ECMs into the encrypted transport stream it sends to the downstream client devices. In an exemplary embodiment, the last ECM may be a third ECM and the last control word may be a third control word for use during e.g., a third crypto period when, for example, the first set of ECMs includes three ECMs. The downstream client device may derive the third control word using the third ECM and may descramble the service (e.g., the encrypted transport stream) using the third control word during a third crypto period after the downstream client devices have received the transport stream. In some embodiments, the first set of ECMs may include more than three ECMs to be used with more than three crypto periods. In such embodiments, the last ECM may correspond to the last crypto period for the first set of ECMs. Moreover, the EQAM may send the additional intermediate ECMs for use with intermediate crypto periods prior to sending the last ECM of the first set of ECMs.

In step 825, the EQAM may determine whether the service is complete. For example, in step 825, the EQAM may tear down the session and/or may otherwise end the service in response to a determination that the service may be complete. In response to a determination by the EQAM that the service may be incomplete, the EQAM may perform steps 830-860. Due to the network failure between the EQAM and the ECMG, the EQAM might not be able to request and/or receive another set (e.g., another batch) of ECMs and associated control words from the ECMG.

In step 830, the EQAM may send to the downstream client devices a first copy of the first ECM. For example, in step 830, the EQAM may encrypt the transport stream for a next crypto period (e.g., a fourth crypto period) using a first copy of the first control word. The EQAM may insert the first copy of the first ECM into the encrypted transport stream it sends to the downstream client devices. The first copy of the first ECM may include the first scrambled control word or may otherwise include information used to derive the first control word. The downstream client devices may derive the first control word from the first copy of the first ECM and may descramble the service (e.g., the encrypted transport stream) using the first control word during a fourth crypto period after the downstream client devices have received the transport stream.

In step 835, the EQAM may determine whether the service is complete. In response to a determination that the service may be complete, the EQAM may tear down the session and/or may otherwise end the service. In response to a determination by the EQAM that the service may be incomplete, the method may continue to step 840.

In step 840, the EQAM may send to the downstream devices a first copy of the second ECM. For example, in step 840, the EQAM may encrypt the transport stream for a next crypto period (e.g., a fifth crypto period) using a first copy of the second control word. The EQAM may insert the first copy of the second ECM into the encrypted transport stream it sends to the downstream client devices. The first copy of the second ECM may include the second scrambled control word or may otherwise include information used to derive the second control word. The downstream client devices may derive the second control word from the first copy of the second ECM and may descramble the service (e.g., the encrypted transport stream) using the second control word during a fifth crypto period after the downstream client devices have received the transport stream.

In step 845, the EQAM may determine whether the service is complete. In response to a determination that the service may be complete, the EQAM may tear down the session and/or may otherwise end the service. In response to a determination by the EQAM that the service may be incomplete, the method may continue to step 850.

In step 850, the EQAM may send to the downstream devices a first copy of the last ECM. For example, in step 850, the EQAM may encrypt the transport stream for a next crypto period (e.g., a sixth crypto period) using a first copy of the last control word (e.g., a first copy of the third control word). The EQAM may insert into the transport stream the first copy of the last ECM (e.g., the first copy of the third ECM) into the encrypted transport stream it sends to the downstream client devices. The first copy of the last ECM may include the scrambled last control word or may otherwise include information used to derive the last control word. The downstream client devices may derive the last control word from the first copy of the last ECM and may descramble the service (e.g., the encrypted transport stream) using the last control word during a sixth crypto period after the downstream client devices have received the transport stream.

In step 855, the EQAM may determine whether the service is complete. In response to a determination that the service may be complete, the EQAM may tear down the session and/or may otherwise end the service. In response to a determination by the EQAM that the service may be incomplete, the method may continue to step 860.

In step 860, the method may repeat the round-robin reuse of controls words and associated ECMs for each crypto period. For example, the EQAM may repeat steps 830-855 using another copy (e.g., a second copy) of the control words and associated ECMs of the first set of control words and associated ECMs until the service is complete or until network communication between the EQAM and the ECMG is restored.

By continuously retaining a copy of each control word used to encrypt the transport stream in respective crypto periods and a copy of each associated ECM sent to the downstream client devices, the EQAM may continue to use different control words for encrypting the transport stream in different crypto periods and send the corresponding and different ECMs to the downstream client devices. As a result, in the event of a network outage, the EQAM may continue to encrypt the transport stream using a different control word for each crypto period. Thus, the EQAM might not have to prolong the use of a single control word. For example, the EQAM might not have to continuously use a last control word to encrypt the transport stream until the service is completed and/or network connectivity is restored.

While the above method illustrated three ECMs of the first set of ECMs, in some embodiments, the method may be implemented with more than three ECMs. For example, the first set of ECMs may include 500 ECMs respectively along with the associated 500 control words. The method described above in connection with FIG. 8 may be altered to accommodate the 500 ECMs and associated control words.

In some embodiments, the EQAM may have received and cached multiple sets of ECMs (e.g., multiple batches of ECMs). For example, the EQAM may have cached a second set of ECMs prior to losing network connectivity with the ECMG. In such an example, the EQAM may reuse ECMs of the first set of ECMs and ECMs of the second set of ECMs. Particularly, the EQAM may also maintain copies of the second set of ECMs for use with a given set of crypto periods.

In some embodiments, the schedule (generated by the ECMG and sent to the EQAM) may indicate and/or may otherwise provide scheduling information for the reuse of ECMs in the event of a loss of connectivity with the ECMG. For example, the EQAM may schedule and use the copies of the control words for transport encryption and send the copies of the associated ECMs to the downstream client devices based on the schedule.

In some embodiments, the schedule (generated by the ECMG and sent to the EQAM) may indicate and/or may otherwise provide scheduling information for the reuse of ECMs in the event of a loss of connectivity with the ECMG. For example, the EQAM may schedule and use the copy of the last control word (that the EQAM received from the ECMG for the specific service) for transport encryption of the service and send the copy of the associated ECM to the downstream client devices based on the schedule. In such embodiments, no prior indication is given to the EQAM to make copies of the control words and associated ECMs that were used in the previous crypto periods. In the boundary case where a network failure happened and only one control word and associated ECM is left, the EQAM may continue to be use the above schedule.

While the method in FIG. 8 describe a round-robin approach for the reuse of control words and associated ECMs, any number of control word selection preset approaches may be implemented. For example, the EQAM may select the copy of the ECM based on a pseudo-random algorithm. For example, the EQAM may select the copy of the ECM of every third originally scheduled ECM for use with the next crypto period. For example, the EQAM may select the copy of the first ECM for use with next crypto period. The EQAM may then select the copy of the third ECM for use with the following crypto period. In some embodiments, the EQAM may switch from a first approach (e.g., a round robin approach) to a second approach (e.g., the every third ECM approach) after a predetermined period of time and/or number of crypto periods.

In some embodiments, the reuse of control words and associated ECMs might not be in response to a network failure. In such embodiments, controls words and associated ECMs may be reused even if the network connectivity has been maintained (i.e., there has been no loss of network connectivity). For example, the EQAM may reuse control words and associated ECMs when either the EQAM or the ECMG has limited processing capability. For example, the EQAM may reuse control words and associated ECMs when there is network connectivity but that network connectivity is limited either by design or due to network traffic. In such instances, the ECMG by design may supply only a subset of the number of control words and associated ECMs needed as compared to the number required based on the schedule and selected crypto period. For example, in the event the EQAM may use 7,200 control words in total for a two hour movie with a one second crypto period, the ECMG may deliver only 600 control words and associated ECMs either in one batch or in multiple batches. The EQAM may use each control word and associated ECM 12 times, or reuse each control word eleven additional times on average based on a selected reuse method.

The same methodology is used for supporting multiple simultaneous services. In other words, for each service supported by the EQAM, the EQAM may receive from the ECMG only a subset of control words and associated ECMs typically used to support the service. The EQAM may reuse the subset of control words and associated ECMs for that specific service.

In some embodiments, the EQAM may request and receive a common set of control words and associated ECMs either in one batch or multiple batches. The EQAM may reuse the common set of control words and associated ECMs for each service supported by the EQAM. In some embodiments, the EQAM may use the common set of control words and associated ECMs only during a short preset interval at the beginning of each service. For example, when the EQAM detects a service and before establishing an encryption session with an ECMG, the EQAM may, for a specified time period, use the common set of control words to encrypt the service. After the specified time period, the EQAM may switch over to using a set of control words and associated ECMs specific to the service received from the ECMG. The EQAM may continuously receive and cache new sets of control words and associated ECMs until a full supply of control words and associated ECMs have been received by the EQAM to support the service. Alternatively, in some embodiments, the EQAM may receive only a subset of the control words and associated ECMs used to support the service and may reuse those control words and associated ECMs to support the service until the service is complete.

In some embodiments, multiple successive ECMs received in the transport stream by downstream client devices may be used to derive a control word. In other words, the downstream client devices may derive a first control word based collectively on both a first ECM and a second successive ECM received in the transport stream. For example, the downstream client device may obtain a first portion of information used to derive the first control word from the first ECM and may obtain a second portion of information used to derive the first control word from the second ECM. In some embodiments, in order for the downstream client device to obtain a control word, the information to derive the control word may be divided among more than two successive ECMs.

As illustrated above, various aspects of the disclosure relate to providing control word management functionalities. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
    caching concurrently, by a computing device, a first set of control words and a first set of entitlement control messages (ECMs) associated with the first set of control words;

encrypting a transport stream, for a first service, using a first control word of the first set of control words during a first cryptographic period;

encrypting the transport stream, for the first service, using a second control word of the first set of control words different from the first control word during a second cryptographic period, wherein the second cryptographic period occurs after the first cryptographic period;

encrypting the transport stream, for the first service, using the first control word of the first set of control words during a third cryptographic period, wherein the third cryptographic period occurs after the first cryptographic period and the second cryptographic period;

inserting into the transport stream, for the first service, a first ECM, of the first set of ECMs, corresponding to the first control word; and sending, to a device downstream from the computing device, the transport stream.

2. The method of claim 1, further comprising:

sending, by the computing device and to an ECM generator, a request for a particular number of ECMs; and in response to the sending the request, receiving, by the computing device and from the ECM generator, a set of ECMs comprising a number of ECMs different from the particular number of ECMs.

3. The method of claim 1, further comprising:

receiving a request for the first service;

determining a number of control words sufficient to stream the first service for a predetermined period of time greater than one cryptographic period based on a program schedule associated with the first service;

sending, from the computing device and to an ECM generator, a request for a particular number of control words equivalent to the number of control words determined to be sufficient to stream the first service for the predetermined period of time; and receiving, by the computing device and from the ECM generator, a second set of control words having a number of control words equivalent to the particular number of control words of the request.

4. The method of claim 1, further comprising:

in response to a determination that a number of control words cached at the computing device is less than a predetermined threshold number, receiving, from an ECM generator, a second set of control words and a second set of ECMs greater than the predetermined threshold number, wherein the second set of ECMs is associated with the second set of control words.

5. The method of claim 1, further comprising:

in response to a determination that a number of control words cached at the computing device has exceeded a predetermined threshold number, preventing, by the computing device, receipt of a new set of control words and a new set of ECMs associated with the new set of control words.

6. The method of claim 1, further comprising:

receiving, by the computing device, a second set of control words and a second set of ECMs associated with the second set of control words for use with a different transport stream associated with a second service different from the first service.

7. The method of claim 1, further comprising:

after sending to the device downstream from the computing device a last ECM of the first set of ECMs, sending, by the computing device and to the device downstream from the computing device, the first ECM of the first set of ECMs used to calculate the first control word for use during another cryptographic period different from the first cryptographic period.

8. The method of claim 1, further comprising:

determining to reuse one or more control words, of the first set of control words, and one or more ECMs, of the first set of ECMs, in response to a network failure between the computing device and an ECM generator, wherein the one or more ECMs are associated with the one or more control words.

9. The method of claim 1, further comprising:

setting the first cryptographic period to a time period less than a latency time of requesting and receiving a new control word and associated new entitlement control message (ECM) from an ECM generator.

10. A method comprising:

receiving, by a computing device and from an entitlement control message (ECM) generator, a first set of ECMs as a batch;

caching concurrently, by the computing device, a first set of control words and the first set of ECMs, the first set of ECMs being associated with the first set of control words for use with a first service;

encrypting a transport stream, for the first service, using a first control word of the first set of control words during a first cryptographic period, using a second control word of the first set of control words different from the first control word during a second cryptographic period, and using the first control word during a third cryptographic period, wherein the second cryptographic period occurs after the first cryptographic period, and the third cryptographic period occurs after the second cryptographic period;

inserting into the transport stream a first ECM, of the first set of ECMs, corresponding to the first control word; and sending, to a device downstream from the computing device, the transport stream.

11. The method of claim 10, further comprising:

receiving, by the computing device and from the ECM generator, a schedule indicative of an order of the first set of control words to be scheduled for use with the first service; and scheduling the first control word and the first ECM for use during the first cryptographic period and scheduling the second control word and a second ECM of the first set of ECMs for use during the second cryptographic period.

12. The method of claim 10, further comprising:

in response to a determination that a number of control words cached at the computing device is less than a predetermined threshold number, receiving, by the computing device and from the ECM generator, a second set of control words and a second set of ECMs greater than the predetermined threshold number, wherein the second set of ECMs is associated with the second set of control words.

13. The method of claim 10, further comprising:

encrypting a different transport stream using the first control word, wherein the different transport stream is different from the transport stream and is associated with a second service different from the first service.

14. The method of claim 13, wherein the encrypting of the different transport stream occurs simultaneously with the encrypting of the transport stream using the first control word.

15. The method of claim 10, further comprising:
setting the second cryptographic period to a time period less than a latency time in requesting and receiving a new control word and associated new ECM from the ECM generator.

16. A method comprising:
caching concurrently, by a computing device, a first set of control words and a first set of entitlement control messages (ECMs) associated with the first set of control words;
encrypting a transport stream, for a first service, using a particular control word of the first set of control words according to a schedule, wherein the schedule comprises an indication to encrypt the transport stream using the particular control word during a first cryptographic period, using a different control word during a second cryptographic period after the first cryptographic period, and using the particular control word during a third cryptographic period after the first cryptographic period and the second cryptographic period;
inserting into the transport stream a particular ECM, of the first set of ECMs, corresponding to the particular control word; and
sending, to a device downstream from the computing device, the transport stream.

17. The method of claim 16, further comprising:
receiving from an ECM generator the schedule, the schedule being indicative of a use order of the first set of control words associated with the first set of ECMs.

18. The method of claim 16, further comprising:
receiving a request for the first service;
determining a number of control words sufficient to stream the first service for a predetermined period of time greater than one cryptographic period based on a program schedule associated with the first service;
sending, by the computing device and to an ECM generator, a request for a particular number of control words equivalent to the number of control words determined to be sufficient to stream the first service for the predetermined period of time; and
receiving, by the computing device and from the ECM generator, a set of control words having a number of control words equivalent to the particular number of control words of the request.

19. The method of claim 16, further comprising:
in response to a determination that a number of control words cached at the computing device is less than a predetermined threshold number, receiving, by the computing device and from an ECM generator, a second set of control words and a second set of ECMs greater than the predetermined threshold number, wherein the second set of ECMs is associated with the second set of control words.

20. The method of claim 16, wherein the computing device comprises an edge quadrature amplitude modulation (QAM) modulator with an embedded encryptor.

* * * * *